(12) United States Patent
Fukuyama

(10) Patent No.: US 11,201,526 B2
(45) Date of Patent: Dec. 14, 2021

(54) RESIN SEALING DEVICE AND RESIN SEALING METHOD FOR MANUFACTURING MAGNET EMBEDDED CORE

(71) Applicant: Kuroda Precision Industries Ltd., Kanagawa (JP)

(72) Inventor: Osamu Fukuyama, Kanagawa (JP)

(73) Assignee: KURODA PRECISION INDUSTRIES LTD., Kawasaki (JP)

(*) Notice: Subject to any disclaimer, the term of this patent is extended or adjusted under 35 U.S.C. 154(b) by 212 days.

(21) Appl. No.: 16/087,675

(22) PCT Filed: Oct. 31, 2016

(86) PCT No.: PCT/JP2016/082291
§ 371 (c)(1),
(2) Date: Sep. 24, 2018

(87) PCT Pub. No.: WO2017/179231
PCT Pub. Date: Oct. 19, 2017

(65) Prior Publication Data
US 2019/0089232 A1    Mar. 21, 2019

(30) Foreign Application Priority Data

Apr. 13, 2016  (WO) ................. PCT/JP2016/002009
Sep. 9, 2016   (WO) ................. PCT/JP2016/004123

(51) Int. Cl.
*H02K 15/03* (2006.01)
*H02K 15/12* (2006.01)
(Continued)

(52) U.S. Cl.
CPC .......... *H02K 15/125* (2013.01); *B29C 43/18* (2013.01); *B29C 45/03* (2013.01);
(Continued)

(58) Field of Classification Search
CPC . H01F 41/0246; H01F 41/0253; B29C 43/00; B29C 43/006; B29C 43/206;
(Continued)

(56) References Cited

U.S. PATENT DOCUMENTS 2,883,703 A * 4/1959 Frank ................. B30B 11/04
                                                425/78
3,488,410 A * 1/1970 Downes ............... B29C 70/62
                                                264/437
(Continued)

FOREIGN PATENT DOCUMENTS

CN      101356711 A     1/2009
CN      102843000 A    12/2012
(Continued)

OTHER PUBLICATIONS

European Search Report 16898547.1 (dated Nov. 11, 2019) (Year: 2019).*

(Continued)

*Primary Examiner* — Joseph S Del Sole
*Assistant Examiner* — Margaret B Hayes
(74) *Attorney, Agent, or Firm* — Dority & Manning, P.A.

(57) ABSTRACT

A magnet embedded core is manufactured in a stable manner by preventing an excessive pressurizing force from being applied to the laminated iron core and performing the clamping with an appropriate pressurizing force so that the leakage of the resin out of the magnet insertion holes can be minimized, and the reduction in the geometric and dimensional precision of the laminated iron core may be suppressed. An electric die clamping device is used, such that a laminated iron core is placed on one of a fixed die and a moveable die and upon clamping by the die clamping device, the other of the fixed die and the moveable die is caused to abut onto an end surface of the laminated iron core (Continued)

to close openings of magnet insertion holes and pressurize the laminated iron core in a laminating direction.

4 Claims, 14 Drawing Sheets

(51) Int. Cl.
| | |
|---|---|
| *B29C 43/18* | (2006.01) |
| *H02K 1/27* | (2006.01) |
| *H02K 1/28* | (2006.01) |
| *H02K 11/20* | (2016.01) |
| *H02K 11/21* | (2016.01) |
| *H02K 11/30* | (2016.01) |
| *B29C 45/03* | (2006.01) |
| *B29C 45/14* | (2006.01) |
| *B29C 45/76* | (2006.01) |
| *B29C 45/80* | (2006.01) |
| *F16H 25/20* | (2006.01) |
| *H02K 7/06* | (2006.01) |
| *B29K 101/10* | (2006.01) |
| *B29K 105/00* | (2006.01) |
| *B29L 31/00* | (2006.01) |

(52) U.S. Cl.
CPC .... *B29C 45/14467* (2013.01); *B29C 45/7653* (2013.01); *B29C 45/80* (2013.01); *F16H 25/20* (2013.01); *H02K 1/276* (2013.01); *H02K 1/28* (2013.01); *H02K 7/06* (2013.01); *H02K 11/20* (2016.01); *H02K 11/21* (2016.01); *H02K 11/30* (2016.01); *H02K 15/03* (2013.01); *H02K 15/12* (2013.01); *B29C 2043/182* (2013.01); *B29C 2945/76006* (2013.01); *B29C 2945/76083* (2013.01); *B29C 2945/76568* (2013.01); *B29K 2101/10* (2013.01); *B29K 2105/251* (2013.01); *B29K 2995/0008* (2013.01); *B29L 2031/7498* (2013.01); *F16H 2025/2053* (2013.01)

(58) Field of Classification Search
CPC ....... B29C 43/361; B29C 33/53; B29C 33/54; H02K 1/276
See application file for complete search history.

(56) References Cited

U.S. PATENT DOCUMENTS

| | | | | |
|---|---|---|---|---|
| 3,568,554 A * | 3/1971 | Wiechec | ............. | H01F 41/0246 83/98 |
| 4,923,383 A * | 5/1990 | Kurumaji | ................ | B29C 43/58 100/46 |
| 5,110,687 A * | 5/1992 | Abe | .......... | B22F 7/06 156/308.2 |
| 7,001,545 B2 * | 2/2006 | Okado | .................... | B29C 43/58 264/40.1 |
| 7,506,530 B2 * | 3/2009 | Iwashita | ................ | B21D 24/02 72/20.2 |
| 8,896,177 B2 | 11/2014 | Kim | | |
| 8,991,035 B2 | 3/2015 | Sasaki et al. | | |
| 2008/0276446 A1 * | 11/2008 | Amano | .................. | H02K 1/276 29/598 |
| 2009/0085416 A1 * | 4/2009 | Masuzawa | ................ | H01F 1/26 310/44 |
| 2009/0189309 A1 * | 7/2009 | Matsubayashi | ... | B29C 45/14065 264/263 |
| 2010/0083486 A1 | 4/2010 | Amano et al. | | |
| 2013/0069747 A1 * | 3/2013 | Honkura | ............... | B29C 43/003 335/302 |
| 2014/0042856 A1 | 2/2014 | Miyashita et al. | | |
| 2014/0124978 A1 | 5/2014 | Mabu | | |
| 2014/0131919 A1 | 5/2014 | Mabu | | |
| 2014/0196276 A1 | 7/2014 | Nagai et al. | | |
| 2014/0327329 A1 * | 11/2014 | Kitada | .................. | H02K 15/03 310/43 |
| 2015/0054196 A1 | 2/2015 | Ishimatsu et al. | | |

FOREIGN PATENT DOCUMENTS

| | | | |
|---|---|---|---|
| DE | 102011078419 | | 6/2012 |
| DE | 102011119512 | | 5/2013 |
| JP | 2001169485 | | 6/2001 |
| JP | 2001352747 | | 12/2001 |
| JP | 2002272033 | | 9/2002 |
| JP | 2005185081 | | 7/2005 |
| JP | 2006211748 | | 8/2006 |
| JP | 2006311782 | | 11/2006 |
| JP | 2007110880 | | 4/2007 |
| JP | 2009100634 | | 5/2009 |
| JP | 2009171785 | | 7/2009 |
| JP | 2010213536 | | 9/2010 |
| JP | 2012010595 | | 1/2012 |
| JP | 2012223024 | | 11/2012 |
| JP | 2012223024 | A * | 11/2012 |
| JP | 2014007926 | | 1/2014 |
| JP | 2014018074 | | 1/2014 |
| JP | 2014079056 | A * | 5/2014 |
| JP | 2014079056 | A | 5/2014 |
| JP | 2014083811 | | 5/2014 |
| JP | 2014093917 | | 5/2014 |
| JP | 2014138448 | | 7/2014 |
| JP | 2014143919 | | 8/2014 |
| JP | 2015039296 | A * | 2/2015 |
| JP | 2015089169 | | 5/2015 |

OTHER PUBLICATIONS

European Search Report for EP16898547.1 dated Nov. 11, 2019, 12 pages.
European Search Report for EP16898548,9 dated Nov. 11, 2019, 17 pages.
International Search Report for PCT/JP2016/002009 dated Jul. 7, 2016, 1 page.
International Search Report for PCT/JP2016/004123 dated Nov. 24, 2016, 2 pages.
International Search Report for PCT/JP2016/082291 dated Jan. 18, 2017, 1 page.
International Search Report for PCT/JP2017/012034 dated Jun. 12, 2017, 2 pages.
International Search Report for PCT/JP2017/014700 dated Jun. 29, 2017, 3 pages.
Japanese Office Action for JP2017200993 dated Feb. 13, 2018, 4 pages.
Japanese Office Action for JP2017528861 dated Jan. 16, 2018, 4 pages.

* cited by examiner

RESIN SEALING DEVICE AND RESIN SEALING METHOD FOR MANUFACTURING MAGNET EMBEDDED CORE

CROSS REFERENCE TO RELATED APPLICATIONS

This application is the U.S. National Stage entry of International Application Number PCT/JP2016/082291 filed under the Patent Cooperation Treaty having a filing date of Oct. 31, 2016, which claims priority to international Application Number PCT/JP2016/002009 filed under the Patent Cooperation Treaty having a filing date of Apr. 13, 2016, and International Application Number PCT/JP2016/004123 filed under the Patent Cooperation Treaty having a filing date of Sep. 9, 2016, which are incorporated herein by reference.

TECHNICAL FIELD

The present invention relates to a resin sealing device and a resin sealing method for manufacturing a magnet embedded core, and in particular to a resin sealing device and a resin sealing method for manufacturing a magnet embedded core for use in rotating electric machinery.

BACKGROUND ART

It is known to implement a rotor core or a stator core of a rotating electric machinery such as an electric motor and an electric power generator as a magnet embedded core manufactured by inserting a magnet piece into each of a plurality of magnet insertion holes opening out at least at one of the end surfaces of a laminated iron core, and sealing the magnet piece with resin that is filled in the magnet insertion hole. See Patent Document 1, for instance.

The resin sealing process fir a magnet embedded core can be performed by using a resin sealing device which is similar to an injection molding device, and comprises a fixed platen, a moveable platen placed opposite to the fixed platen so as to be moveable in a direction toward and away from the fixed platen, a die clamping device configured to drive the moveable platen in the direction toward and away from the fixed platen, a fixed die secured to the fixed platen so as to have a laminated iron core that is to be sealed with resin mounted thereon, and a moveable die secured to the moveable platen so as to abut onto the end surface of the laminated iron core upon clamping by the die clamping device to close the openings of the magnet insertion holes and pressurize the laminated iron core in the laminating direction.

By the die clamping performed in this manner, the resin charged into the resin insertion holes is prevented from leaking out, and thus, the magnet pieces can be sealed with resin in a reliable manner.

The laminated iron core is formed by laminating or stacking a plurality of iron core laminates which are blanked into a prescribed shape. Therefore, when the laminated iron core is pressurized in the laminating direction by the clamping, the gaps between the adjacent iron core laminates decrease in size so that an amount of the resin leaking into the gaps is reduced. As a result, by curing the resin in the magnet insertion holes while the laminated iron core is pressurized, a high quality magnet embedded core having a stable magnetic performance can be obtained owing to the minimization of the resin leaking into the gaps between the adjoining iron core laminates.

Patent Document 1: JP2014-79056A

SUMMARY OF THE INVENTION

Task to be Accomplished by the Invention

However, if the resin in the magnet insertion holes is cured while the laminated iron core is deformed in the laminating direction, once the laminated iron core is released from the die assembly, the gaps are kept closed in areas adjoining the magnet insertion holes owing to the bonding action by the cured resin, but the gaps in areas remote from the magnet insertion holes may expand back to the original state owing to the lack of bonding action by the resin.

Since the deformation of the laminated iron core in the laminating direction at the time of clamping increases with an increase in the magnitude of the pressurizing force (clamping force) acting on the laminated iron core in the laminating direction during the clamping, the above phenomenon becomes more pronounced as the magnitude of the pressurizing force increases. Therefore, when the resin is cured while an excessive pressurizing force is applied to the laminated iron core, the planarity of the end surfaces of the laminated iron core may be impaired. Also, the stacking height may vary from one laminated iron core to another to such an extent that some difficulty may be encountered in obtaining high quality magnet embedded cores having a high geometric and dimensional precision in a stable manner.

Furthermore, owing to the tendency of the laminated iron core to regain the original state following the releasing of the clamping force, some stress may be created in the laminated iron core and in the resin that has been cured in the magnet insertion holes. This stress becomes greater as the magnitude of the pressurizing force during the clamping increases owing to the corresponding increase in the deformation of the laminated iron core in the laminating direction at the time of clamping. Therefore, when the resin is cured while an excessive pressurizing force is applied to the laminated iron core by the clamping, the resin in the magnet insertion holes may peel off and/or crack with the result that a high quality magnet embedded core may not be obtained in a reliable manner.

The die clamping device used for a resin sealing device may consist of a toggle die clamping device. However, generally available toggle die clamping devices are provided with rated clamping forces in the order of several tens of tons, and such a range of clamping force may result in an excessive pressurizing force applied to laminated iron cores.

A primary task of the present invention is to manufacture a high quality magnet embedded core in a stable manner by preventing an excessive pressurizing force from being applied to the laminated iron core and performing the clamping with an appropriate pressurizing force so that the leakage of the resin out of the magnet insertion holes can be minimized, and the reduction in the geometric and dimensional precision of the laminated iron core may be suppressed.

Means to Accomplish the Task

The present invention provides a resin sealing device for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, the resin sealing device comprising: a fixed platen; a moveable platen placed opposite to the fixed platen so as to be moveable in a direction toward and away from the fixed platen; a die clamping device configured to drive the moveable platen in the direction toward and away from the fixed platen; a fixed die attached to the fixed platen; and a moveable die attached to the moveable platen, wherein one of the fixed die and the moveable die is configured to place the laminated iron core thereon, and the other of the fixed die and the moveable die is configured to abut onto the end surface of the laminated iron core upon clamping by the die clamping device to close the openings of the magnet insertion holes and pressurize the laminated iron core in a laminating direction, the die clamping device comprising at least three electric motors configured to drive the moveable platen.

According to this arrangement, when the die assembly is closed, the fixed die or the moveable die is brought into contact with the end surface of the laminated iron core to close the openings of the magnet insertion holes and pressurize the laminated iron core in the laminating direction at the same time. The pressurizing force at this time can be freely selected by a quantitative control of the electric motors so that an appropriate pressurizing force is applied to the laminated iron core when the die assembly is closed, instead of applying an excessive pressurizing force to the laminated iron core. Thereby, a dimensionally precise, high quality magnet embedded core can be manufactured in a stable manner.

In the resin sealing device for manufacturing a magnet embedded core according to the present invention, preferably, the die clamping device comprises: at least three nuts provided on the moveable platen; and a plurality of feed screw shafts provided rotatably on the fixed platen and threadably engaged by the corresponding nuts, each electric motor consisting of a rotary motor, and being mounted on the fixed platen so as to individually and rotatively drive a corresponding one of the feed screw shafts.

According to this arrangement, the rotational movements of the electric motors are transformed into a linear motion of the moveable platen via the nuts and the feed screw shafts so that the moveable platen can be moved in a direction toward and away from the fixed platen in an accurate manner.

In the resin sealing device for manufacturing a magnet embedded core according to the present invention, preferably, the electric motors each consist of a linear motor.

According to this arrangement, the moveable platen can be moved in a direction toward and away from the fixed platen in an accurate manner owing to the linear motion of the linear motors.

Preferably, the resin sealing device for manufacturing a magnet embedded core according to the present invention further comprises: a plurality of pressing force sensors configured to detect pressing forces acting between the fixed die and the moveable die due to driving of the electric motors; and a control unit configured to control the driving of the electric motors according to the pressing forces detected by the pressing force sensors.

According to this arrangement, the driving of the electric motors is feedback controlled by using the pressing forces acting between the fixed die and the moveable die as control variables so that the pressing forces acting between the fixed die and the moveable die can be set as appropriate values.

In the resin sealing device for manufacturing a magnet embedded core according to the present invention, preferably, the control unit is configured to control the driving of the electric motors so as to make the pressing forces detected by the pressing force sensors coincide with a single control target value.

According to this arrangement, the electric motors are driven such that the pressing forces detected by the pressing force sensors are made to coincide with the single control target value, and the laminated iron core can be pressurized in an even manner by the electric motors.

In the resin sealing device for manufacturing a magnet embedded core according to the present invention, preferably, the control unit is configured to control the driving of the electric motors so as to make the pressing threes detected by the pressing force sensors coincide with control target values individually assigned to the respective electric motors.

According to this arrangement, the electric motors are driven such that the pressing forces detected by the pressing force sensors are made to coincide with the respective control target values, and the laminated iron core can be pressurized by the electric motors according to the respective values.

Preferably, the resin sealing device for manufacturing a magnet embedded core according to the present invention further comprises: a plurality of position sensors configured to detect positions of parts of the moveable die corresponding to positions of the respective feed screw shafts; and a control unit configured to control driving of the electric motors according to the positions of the parts of the moveable die as detected by the position sensors.

According to this arrangement, the driving of the electric motors is feedback controlled by using the position of the moveable die as a control variable so that the pressing force acting between the fixed die and the moveable die can be set as an appropriate value.

In the resin sealing device for manufacturing a magnet embedded core according to the present invention, preferably, the control unit is configured to control the driving of the electric motors so as to make the positions of the parts of the moveable die detected by the position sensors coincide with a single control target value.

According to this arrangement, the electric motors are driven such that the positions detected by the position sensors are made to coincide with the single control target value, and the laminated iron core can be pressurized with the moveable die undergoing a strictly translational motion.

In the resin sealing device for manufacturing a magnet embedded core according to the present invention, preferably, the control unit is configured to control the driving of the electric motors so as to make the positions of the parts of the moveable die detected by the position sensors coincide with control target values individually assigned to the respective electric motors.

According to this arrangement, the electric motors are driven such that the positions detected by the position sensors are made to coincide with the respective control target values, and the laminated iron core can be pressurized while the attitude of the moveable die is properly controlled.

The present invention also provides a resin sealing for manufacturing a magnet embedded core including a laminated iron core having magnet insertion holes formed therein, each magnet insertion hole being provided with an opening at least at one of end surfaces of the laminated iron core, and a magnet piece inserted in each magnet insertion hole and sealed by resin charged into the magnet insertion hole, wherein the resin sealing method uses a resin sealing device including a fixed platen, a moveable platen placed opposite to the fixed platen so as to be moveable in a direction toward and away from the fixed platen, an electric die clamping device including an electric motor and configured to drive the moveable platen in the direction toward and away from the fixed platen, a fixed die attached to the fixed platen, and a moveable die attached to the moveable platen, the method comprising: an iron core positioning step of positioning the laminated iron core on one of the fixed die and the moveable die; a resin charging step of charging the resin into the magnet insertion holes; a magnet piece insertion step of inserting the magnet pieces in the respective magnet insertion holes; and a pressurizing step of causing, by use of the die clamping device, the other of the fixed die and the moveable die to abut onto the end surface of the laminated iron core to close the openings of the magnet insertion holes and pressurize the laminated iron core in a laminating direction with the other of the fixed die and the moveable die, wherein the resin is cured in the pressurizing step.

According to this method, the pressurizing force in the pressurizing step can be freely selected by a quantitative control of the electric motors so that an appropriate pressurizing force is applied to the laminated iron core when the die assembly is closed, instead of applying an excessive pressurizing force to the laminated iron core. Thereby, a dimensionally precise, high quality magnet embedded core can be manufactured in a stable manner.

The die clamping device used in the resin sealing method for manufacturing a magnet embedded core according to the present invention preferably includes at least three electric motors configured to drive the moveable platen. The electric motors of the die clamping device may consist of rotary motors, and the die clamping device may include at least three nuts provided on the moveable platen, and a plurality of feed screw shafts provided rotatably on the fixed platen and threadably engaged by the corresponding nuts so that the feed screw shafts are rotatively driven by the corresponding electric motors. Alternatively, the electric motors may consist of linear motors.

In the resin sealing method for manufacturing a magnet embedded core according to the present invention, preferably, the resin charging step includes a step of charging the resin in solid state into the magnet insertion holes, and the method further comprises a melting step of melting the resin in solid state in the magnet insertion holes, and a curing step of curing the resin in molten state in the pressurizing step.

According to this method, as compared to the case where the molten resin is injected into the magnet insertion holes under pressure via runners and gates formed in the die assembly as an injection molding process, the resin which would remain in the runners and the gates can be saved so that the material cost can be reduced with the added advantage of facilitating the maintenance of the die assembly.

In the resin sealing method for manufacturing a magnet embedded core according to the present invention, preferably, the resin consists of a thermosetting resin, and the resin pressurized in the pressurizing step is cured by heating the laminated iron core.

According to this method, the melting of the thermosetting resin in solid state in the melting step and the irreversible curing of the thermosetting resin in the curing step can be performed by using the heat of the laminated iron core in a heat efficient manner.

In the resin sealing method for manufacturing a magnet embedded core according to the present invention, prefer- ably, the melting step includes at least partly melting the resin in solid state by preheating and inserting the magnet pieces in the respective magnet insertion holes.

According to this method, the melting of the thermosetting resin in solid state in the melting step and the irreversible curing of the thermosetting resin in the curing step can be performed by using the heat of the magnet pieces inserted in the magnet insertion holes in a heat efficient manner.

Preferably, the resin sealing method for manufacturing a magnet embedded core according to the present invention further comprises detecting pressing forces acting between the fixed die and the moveable die due to driving of the electric motors by using a plurality of pressing force sensors, and controlling the electric motors according to the pressing forces detected by the pressing force sensors.

According to this method, the driving of the electric motors is feedback controlled by using the pressing forces acting between the fixed die and the moveable die as control variables so that the pressing forces acting between the fixed die and the moveable die can be set as appropriate values.

In the resin sealing method for manufacturing a magnet embedded core according to the present invention, preferably, the driving of the electric motors is controlled so as to make the pressing forces detected by the pressing force sensors coincide with a single control target value.

According to this method, the electric motors are driven such that the pressing forces detected by the pressing force sensors are made to coincide with the single control target value, and the laminated iron core can be pressurized in an even manner by the electric motors.

In the resin sealing method for manufacturing a magnet embedded core according to the present invention, preferably, the driving of the electric motors is controlled so as to make the pressing forces detected by the pressing force sensors coincide with control target values individually assigned to the respective electric motors.

According to this method, the electric motors are driven such that the pressing forces detected by the pressing force sensors are made to coincide with the respective control target values, and the laminated iron core can be pressurized by the electric motors according to the respective values.

Preferably, the resin sealing method for manufacturing a magnet embedded core according to the present invention comprises: detecting positions of parts of the moveable die corresponding to positions of the respective feed screw shafts by using a plurality of position sensors; and controlling the driving of the electric motors according to the positions of the parts of the moveable die as detected by the position sensors.

According to this method, the driving of the electric motors is feedback controlled by using the position of the moveable die as a control variable so that the pressing three acting between the fixed die and the moveable die can be set as an appropriate value.

In the resin sealing method for manufacturing a magnet embedded core according to the present invention, preferably, the driving of the electric motors is controlled so as to make the positions of the parts of the moveable die detected by the position sensors coincide with a single control target value.

According to this method, the electric motors are driven such that the positions detected by the position sensors are made to coincide with the single control target value, and the laminated iron core can be pressurized with the moveable die undergoing a strictly translational motion.

In the resin sealing method for manufacturing a magnet embedded core according to the present invention, preferably, the driving of the electric motors is controlled so as to make the positions of the parts of the moveable die detected by the position sensors coincide with control target values individually assigned to the respective electric motors.

According to this method, the electric motors are driven such that the positions detected by the position sensors are made to coincide with the respective control target values, and the laminated iron core can be pressurized while the attitude of the moveable die is properly controlled.

EFFECTS OF THE INVENTION

According to the resin sealing device and the resin sealing method for manufacturing a magnet embedded core of the present invention, an excessive pressurizing force is prevented from being applied to the laminated iron core in the clamped state, and the clamping is performed with an appropriate pressurizing force so that a dimensionally precise, high quality magnet embedded core can be manufactured in a stable manner.

BRIEF DESCRIPTION OF THE DRAWING(S)

EMBODIMENT(S) FOR CARRYING OUT THE INVENTION

Preferred embodiments of the present invention are described in the following with reference to the appended drawings.

Figure 1:
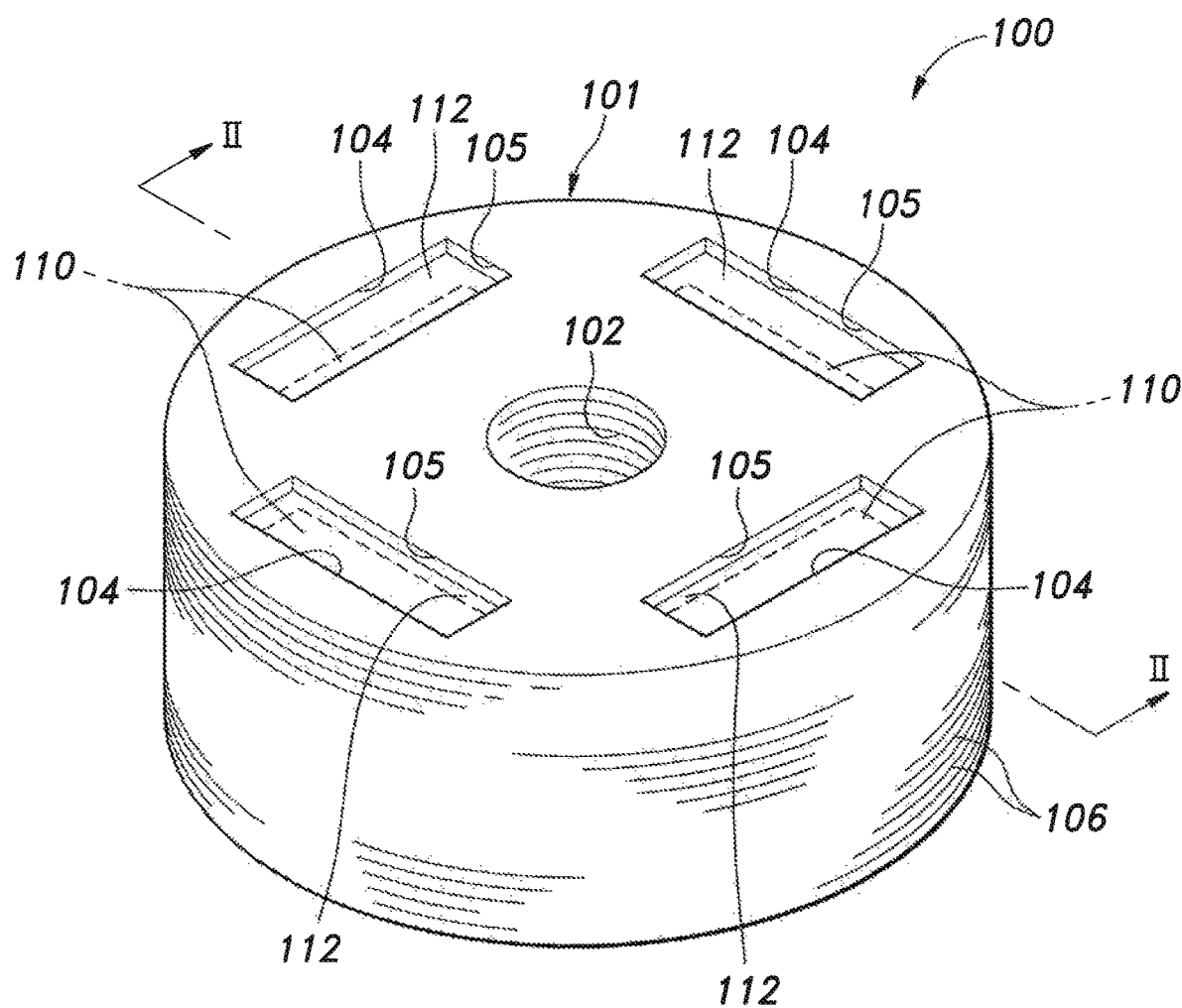
FIG. 1 is a perspective view of an example of a magnet embedded core manufactured by a resin sealing method according to the present invention.
Figure 2:
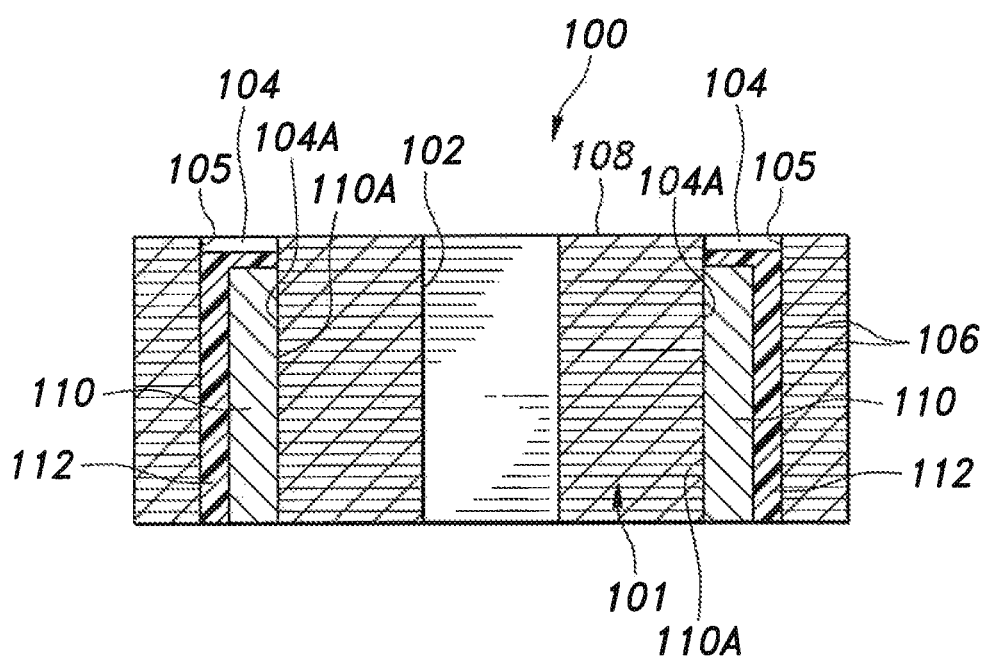
FIG. 2 is a sectional view taken along line II-II of FIG. 1.

First of all, an example of a magnet embedded core manufactured by a resin sealing method according to the present invention is described in the following with reference to FIGS. 1 and 2.

The magnet embedded core 100 has a laminated iron core 101 including a plurality of magnet insertion holes 104, and magnet pieces 110 positioned in the respective magnet insertion holes 104. The laminated iron core 101 is formed by stacking a plurality of iron core laminates 106 each formed by punching and consisting of a disk formed with openings for defining a center hole 102 and the magnet insertion holes 104.

The magnet insertion holes 104 are arranged circumferentially around the center hole 102 at a regular interval, and are each provided with a substantially rectangular shape in plan view (shape of cross section). Each magnet insertion hole 104 extends axially through the laminated iron core 101 in a laminating direction (axial direction), and defines a substantially rectangular space having an upper opening 105 at an upper end surface 108 of the laminated iron core 101. Each magnet insertion hole 104 is passed axially through the laminated iron core 101 in the illustrated embodiment, but may also be provided with a closed bottom by omitting the opening for defining the magnet insertion hole 104 in the low in the lowermost iron core laminate 106.

Each magnet piece 110 has a substantially rectangular parallelepiped shape, and is fixed in position relative to the laminated iron core 101 by resin 112 charged into (filling) the magnet insertion hole 104. The resin 112 may consist of a thermosetting resin such as epoxy resin that can be irreversibly cured by being heated to a temperature higher than a prescribed curing temperature.

Each magnet piece 110 may consist of, for example, a ferrite-based sintered magnet or a permanent magnet (with or without magnetization) such as a neodymium magnet. The axial length of each magnet piece 110 is slightly smaller than the axial length of the magnet insertion hole 104, and the end surface (in this case, the upper surface) of the magnet piece 110 is covered by the resin 112.

The magnet piece 110 in each magnet insertion hole 104 is inwardly offset (or offset toward the center of the laminated iron core 101) so that the outer surface 110A of the magnet piece 110 on the inner side thereof makes a surface contact with (abuts against) the inner surface 104A of the magnet insertion hole 104 on the inner side thereof. In the drawings, for the convenience of description, the clearance between each surface defining the magnet insertion hole 104 (excluding the inner surface 104A) and the corresponding side surface of the magnet piece 110 (excluding the outer surface 110A) is shown greater than the practical size.

A resin sealing device 1 for the magnet embedded core of the illustrated embodiment is described in the following with reference to FIGS. 3 to 8.

The resin sealing device 1 includes a lower fixed platen 10 and an upper moveable platen 12 which are vertically spaced from each other, and squarely oppose each other.

Four servomotors 14 each consisting of a rotary electric motor are attached to four corner parts of the lower bottom part of the lower fixed platen 10, respectively. Each servomotor 14 has an output shaft 18 that extends vertically through a through hole 16 formed in the lower fixed platen 10 in the axial direction (vertical direction). A hail screw shaft (feed screw shaft) 22 is connected to each output shaft 18 by a shaft coupling 20 in a torque transmitting relationship. Each ball screw shaft 22 extends vertically upward beyond the lower fixed platen 10. Through holes 24 are vertically passed through four corner parts of the upper moveable platen 12, respectively, and a ball nut 26 is fixed in each through hole 24. Each ball nut 26 is threadably engaged with the corresponding ball screw shaft 22.

The rotational motion of the output shaft 18 of each servomotor 14 around the vertical axial line is converted into a vertical linear motion by the ball screw shaft 22 and the ball nut 26 so that the upper moveable platen 12 can be driven in the vertical direction by the servomotor 14. An electric die clamping device 34 is thus formed by using these four servomotors 14.

A lower die 30 forming a fixed die is attached to the upper surface 10A of the lower fixed platen 10. An upper die 40 forming a moveable die is attached to the lower surface 12A of the upper moveable platen 12.

The lower die 30 consists of a flat plate that has an upper surface 10A supporting a conveying tray 32. A plurality of such conveying trays 32 are allocated for each resin sealing device 1, and a plurality of laminated iron cores 101 are placed on the respective conveying trays 32 in advance in a location outside of the resin sealing device 1 (or a location different from the resin sealing device 1). By conveying the conveying trays 32 each supporting a laminated iron core 101 to the prescribed position on the lower die 30 in a sequential manner, the operation efficiency of the resin sealing device 1 can be improved. Each laminated iron core 101 is correctly positioned on the corresponding conveying tray 32 with the aid of a positioning member (not shown in the drawings) provided on the conveying tray 32.

A cylindrical heating device 50 for thermally curing the resin 112 charged into the magnet insertion holes 104 is detachably arranged on the outer periphery of the laminated iron core 101. The heating device 50 may consist of a high-frequency induction heating device provided with a coil (not shown in the drawings) for induction heating the laminated iron core 101, for instance.

The upper die 40 is provided with a substantially flat lower surface 40A which opposes a substantially flat upper end surface 108 of the laminated iron core 101 placed on the lower die 30 so that the laminated iron core 101 can be pressurized in the laminating direction (in the downward direction). The upper die 40 is provided with pressurization projections 42 projecting downward from the lower surface 40A thereof. The pressurization projections 42 are each provided with a rectangular shape in plan view which is conformal to the shape of the magnet insertion hole 104 in plan view, and are positioned so as to align with the corresponding magnet insertion holes 104 so as to close the upper openings 105 of the corresponding magnet insertion holes 104, and pressurize the resin 112 in the magnet insertion holes 104. The pressurization projections 42 may also consist of members separate from the upper die 40 and be resiliently supported by springs or the like so as to be vertically moveable relative to the upper die 40.

An embodiment of a control system for the electric die clamping device 34 is described in the following with reference to FIG. 9.

The control system for the electric die clamping device 34 includes an input unit 60 and a control unit 62, and a motor drive nit 64 and a pressing force sensor 66 provided for each servomotor 14.

The input unit 60 includes a man-machine interface that allows the pressing force acting between the lower die 30 and the upper die 40, or the die clamping force to be freely selected, and forwards the selected pressing force to the control unit 62 as a control target value. The selection of the control target value can be performed either a single control target value mode where the control target values of all of the servomotors 14 are identical to one another, or in an individual control target value mode where the control target values of the servomotors 14 are individually selected for the different servomotors 14.

Each pressing force sensor 66 detects the pressing force acting between the lower die 30 and the upper die 40 When the die assembly is clamped at a location corresponding to a corresponding one of the four ball screw shafts 22 (one of the four corner parts of the upper moveable platen 12) as a control value of the corresponding servomotor 14.

The control unit 62 consists of an electronic control unit including a microcomputer and other components, and is configured to provide a manipulated variable that reduces the deviation of the pressing force value (feedback value) obtained from each pressing force sensor from the control target value forwarded from the input unit 60 to zero, and forward a control action signal based on the manipulated variable to the corresponding motor drive unit 64.

The motor drive units 64 may each consist of a per se known device including a power control circuit and other components, and is configured to quantitatively control the electric power to be supplied to the corresponding servomotor 14 according to the control action signal provided by the control unit 62.

Thus, each servomotor 14 is driven according to the electric power supplied thereto, and the corresponding ball screw shaft 22 is caused to rotate so that the upper die descends to close the die assembly, and ascends to open the die assembly.

In this control process, a feedback control based on pressurizing force is performed. In the case of the single control target value mode, the servomotors 14 are driven such that the pressing forces detected by the respective pressing force sensors 66 are made to coincide with a single control target value, and the laminated iron core 101 is pressurized in a uniform manner by the servomotors 14. As a result, the pressing force acting between the lower die 30 and the upper die 40 becomes uniform in the parts corresponding to the locations of the ball screw shafts 22. Thus, the laminated iron core 101 on the lower die 30 is uniformly pressurized with a pressurizing force which is variably and freely selected on the input unit 60.

In the case of the individual control target value mode, the target pressing forces for the positions corresponding to the locations of the different ball screw shafts 22 are individually and variably selected so that the laminated iron core 101 on the lower die 30 is pressurized at individually selected pressing forces at the respective locations corresponding to the different ball screw shafts 22. Thus, the laminated iron core 101 on the lower die 30 is pressurized with a pressurizing force which is appropriate at each of the different locations of the laminated iron core 101.

In either case, since the pressurizing force can be set to a freely selected value by the quantitative control of each servomotor 14, an excessive pressurizing force is prevented from acting on the laminated iron core 101 in the die clamped state, and the laminated iron core 101 can be pressurized with an appropriate pressurizing force so that a magnet embedded core 100 with a high dimensional accuracy and stable quality can be manufactured. An appropriate pressurizing force is determined by the size of the outer diameter of the laminated iron core 101, the number of the iron core laminates 106 and the like, and the pressurizing force produced by each servomotor 14 may be set accordingly.

In the following, the process of sealing the magnet pieces 110 inserted in the respective magnet insertion holes 104 with the resin 112 is described with reference to FIGS. 3 to 8.

Figure 3:
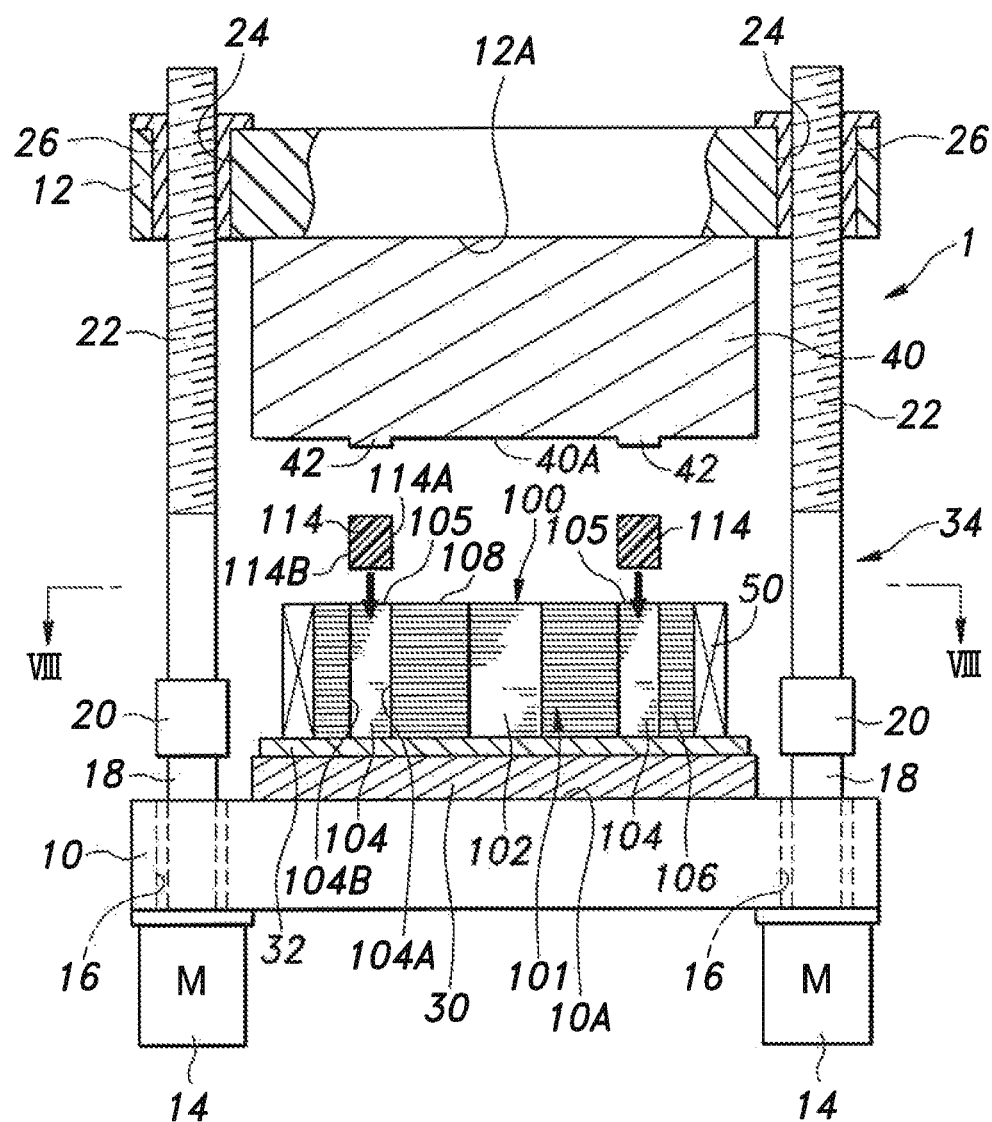
FIG. 3 is a front view of a resin sealing device for the magnet embedded core in a resin charging step partly in section according to an embodiment of the present invention.

First of all, as an iron core positioning step, in a die open condition where the upper moveable platen 12 is at the uppermost position, and the upper die 40 is displaced furthest away from the lower die 30 as shown in FIG. 3, a laminated iron core 101 together with the conveying tray 32 is placed in (or conveyed to) a prescribed position on the lower die 30.

Thereafter, as a resin charging step, a solid resin block 114 is charged into each magnet insertion hole 104 from the upper opening 105 thereof. The resin blocks 114 are formed by preliminarily molding uncured material resin (which may be the same as the resin 112) in powder or granular form into a rectangular brick shape conforming to the shape of the magnet insertion hole 104, and are positioned in the bottom parts of the respective magnet insertion holes 104. The resin blocks 114 are simultaneously heated in the respective magnet insertion holes 104 by the heat from the laminated iron core 101 which is in turn heated by the heating device 50.

The laminated iron core 101 may also be preheated by the heating device 50 or an oven (not shown in the drawings) or the like in a position different from the resin sealing device 1 prior to placing the laminated iron core 101 in the resin sealing device 1. Thereby, the time required for heating the resin block 114 to a temperature required to melt the resin block 114 in a melting step which will be described hereinafter can be reduced. Also, the resin charging step may also be performed in a location different from the resin sealing device 1 before placing the laminated iron core 101. Such measures contribute to a reduction in the work time of the resin sealing device 1, and an improvement in the operation efficiency of the resin sealing device 1.

Each resin block 114 has at least one outer surface, or outer surfaces 114A and 1413 in the illustrated embodiment which are in surface contact with the inner surfaces 104A and 104B of the corresponding magnet insertion hole 104, respectively. As a result, the heat transfer from the laminated iron core 101 to the resin block 114 is efficiently performed as compared to the case where a gap is created between the two so that the heating of the resin block 114 in each magnet insertion hole 104 can be performed rapidly and in a thermally efficient manner.

Figure 4:
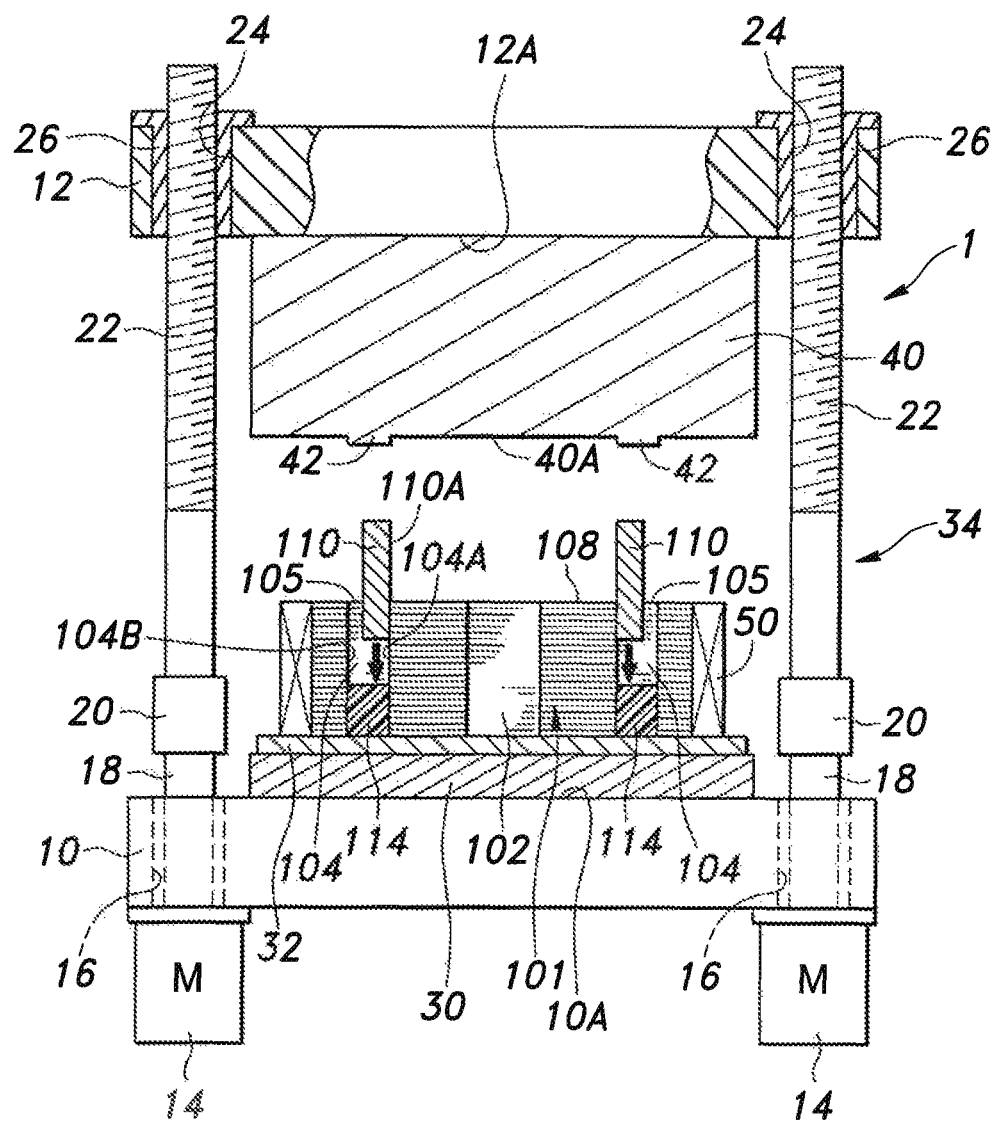
FIG. 4 is a front view of the resin sealing device partly in section in a magnet piece insertion step.
Figure 5:
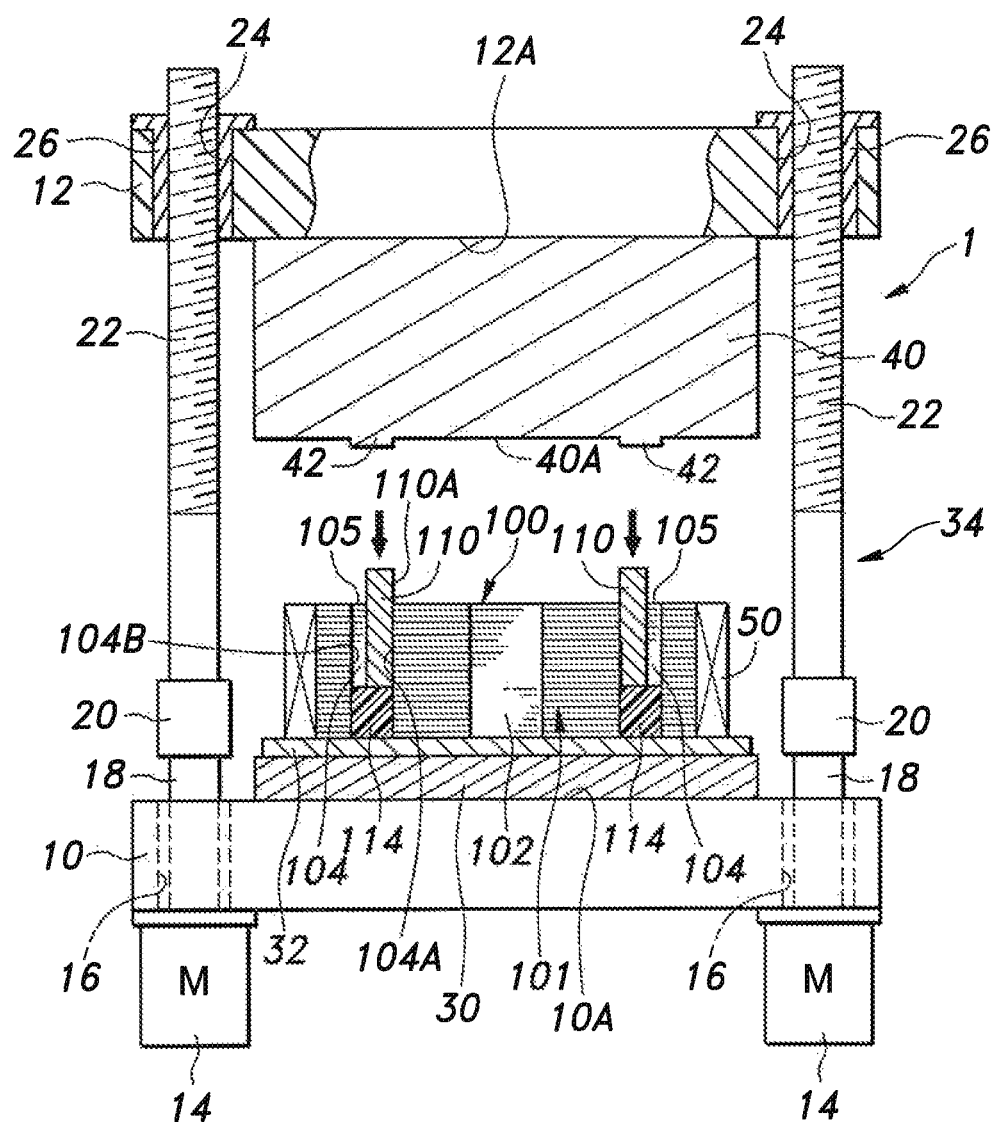
FIG. 5 is a front view of the resin sealing device partly in section at a completion of the magnet piece insertion step.

Subsequently, as a magnet piece insertion step, in the die open condition, magnet pieces 110 are charged into the respective magnet insertion holes 104 from the upper openings 105 thereof as shown in FIG. 4. This is performed in such a manner that one of the outer surfaces 110A of each magnet piece 110 is brought into contact with the inner surface 104A of the magnet insertion hole 104 on the side of the center hole 102, and the lower end surface of the magnet piece 110 is brought into contact with the upper surface of the resin block 114 received in the magnet insertion hole 104 as shown in FIG. 5.

The magnet piece insertion step may also be performed in a location different from the resin sealing device 1 prior to the placing of the laminated iron core 101 on the resin sealing device 1. Such a measure contributes to the reduction in the work time of the resin sealing device 1, and the improvement in the operation efficiency of the resin sealing device 1.

Thereafter, as a melting step, the resin block 114 is heated by the heat of the laminated iron core 101, and is thereby melted. Melting of the resin block 114 means that the material resin forming the resin block 114 is caused to acquire a fluidity by turning into liquid or by softening.

In this melting step, the magnet pieces 110 that are charged into the magnet insertion holes 104 may be preheated by a heating oven (not shown in the drawings) or the like to a prescribed temperature. In such a case, because the resin blocks 114 in the magnet insertion holes 104 are heated not only by the heat of the laminated iron core 101 which has been heated by the heating device 50 but also directly by the heat of the magnet pieces 110, the time required to melt the resin blocks 114 in the melting step can be reduced, and the work efficiency of resin sealing can be improved.

By pushing the magnet piece 110 toward the bottom of the magnet insertion hole 104 while the resin block 114 is in molten state, the liquid level of the molten resin 112 (see FIG. 6) is caused to gradually rise in the magnet insertion hole 104.

Because the resin blocks 114 in the magnet insertion holes 104 are heated not only by the heat of the laminated iron core 101 which has been heated by the heating device 50 but also directly by the heat of the magnet pieces 110 as discussed above, the time required to melt the resin blocks 114 in the melting step can be reduced, and the work efficiency of resin sealing can be improved.

Figure 6:
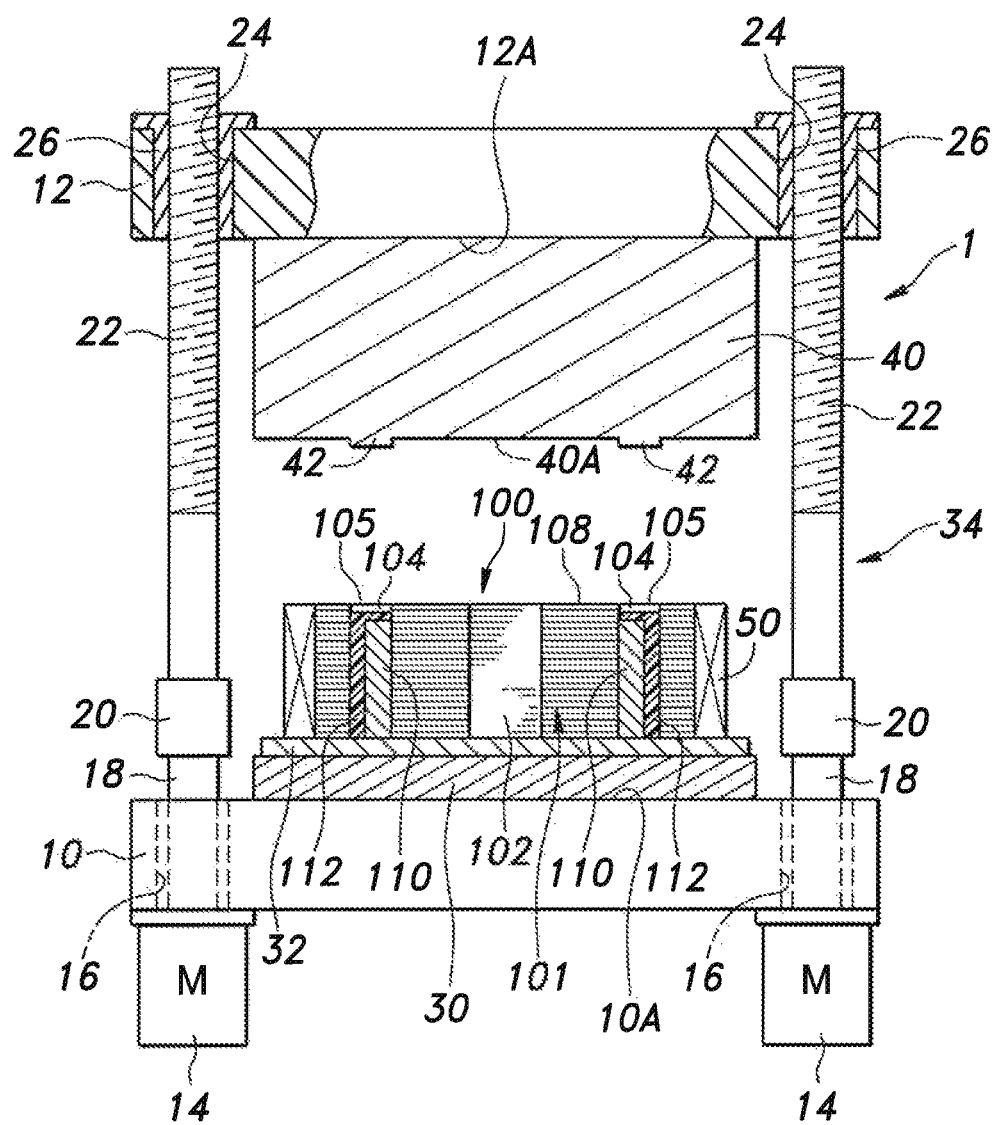
FIG. 6 is a front view of the resin sealing device partly in section in a resin melting step.

As shown in FIG. 6, when the magnet pieces 110 are each pushed fully into the prescribed placement position or to the bottom of the corresponding magnet insertion hole 104, the molten resin 112 fills the gap between the inner surface of the magnet insertion hole 104 remote from the center hole 102 and the corresponding outer side surface of the magnet piece 110, and the liquid level of the resin 112 rises above the upper surface of the magnet piece 110 until the upper surface of the magnet piece 110 is covered by the resin 112.

Then, the servomotors 14 are driven according to the individual control action signals for the servomotors 14 each under the feedback control based on pressurizing force. As a result, the ball screw shafts 22 are turned so that the upper die 40 along with the upper moveable platen 12 descends.

Figure 7:
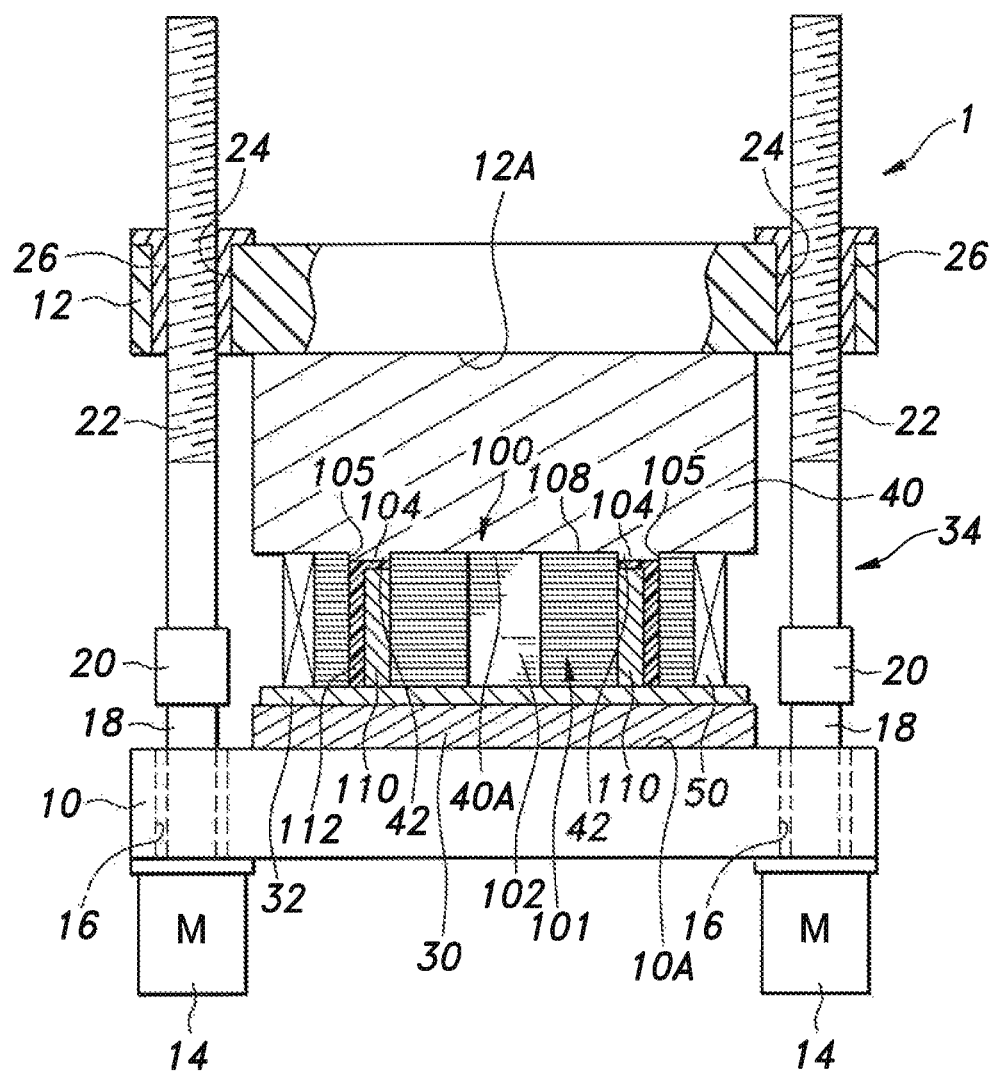
FIG. 7 is a front view of the resin sealing device partly in section in a die clamped state.
Figure 8:
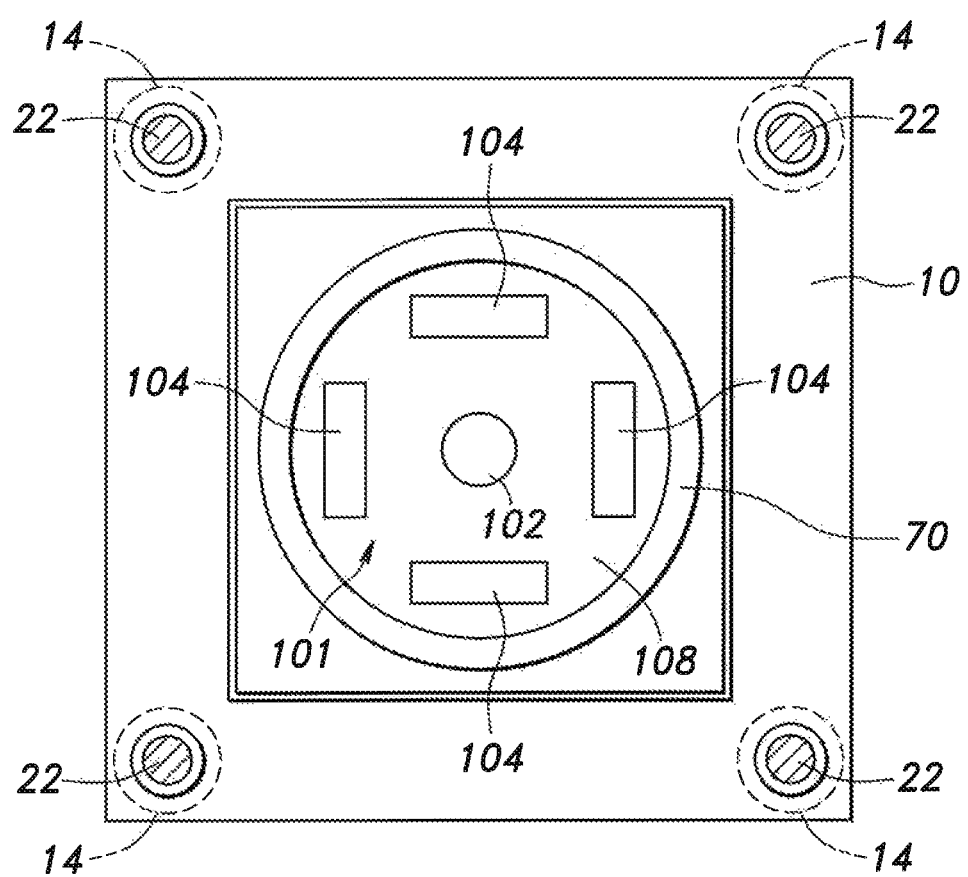
FIG. 8 is a sectional view taken along line of FIG. 3.

As shown in FIG. 7, as the upper moveable platen 12 descends, a die closed condition is accomplished where the lower surface 40A of the upper die 40 comes into surface contact with the upper end surface 108 of the laminated iron core 101 to pressurize the laminated iron core 101 in the laminating direction, and the pressurization projections 42 engage the corresponding magnet insertion holes 104 to close the upper openings 105 and to pressurize the resin 112 in the magnet insertion holes 104.

Once the die closed condition is accomplished, the gaps between adjacent iron core laminates 106 are reduced or eliminated so that leakage of the molten resin 112 into the gaps between the adjacent iron core laminates 106 is decreased or avoided.

While in this die closed condition, as a curing step, the resin 112 is continued to be heated by the laminated iron core 101 which has in turn been heated by the heating device 50 until the resin 112 chemically reacts, and cures irreversibly. Owing to the curing of the resin 112, the magnet pieces 110 are fixed and sealed in the respective magnet insertion holes 104, and the magnet embedded core 100 is completed. The completed magnet embedded core 100 is transported by the conveying tray 32 to the outside of the resin sealing device 1.

Since the curing of the resin 112 or the curing step is performed as an iron core pressurization step in the die closed condition in which the upper die 40 pressurizes the laminated iron core 101 and closes the upper openings 105, the magnet pieces 110 can be sealed with the resin 112 with very little or no resin leaking into the gaps between the adjoining iron core laminates 106. Thereby, a high quality magnet embedded core having a high magnetic performance can be obtained in a reliable manner.

Furthermore, since the curing step is performed while the resin 112 in the magnet insertion holes 104 is pressurized by the projections 24 as a resin pressurization step, air bubbles that may be remaining in the resin 112 are expelled or contracted in a favorable manner before the resin 112 is fully cured so that the magnet pieces 110 can be fixed and sealed in a reliable manner by the resin 112 having few voids therein.

As the resin 112 used for sealing the magnet pieces 110, the resin blocks 114 are charged into the respective magnet insertion holes 104. Therefore, as opposed to the injection molding process in which the molten resin is filled into the magnet insertion holes 104 under pressure via runners and gates formed in the die assembly, wastage of the resin remaining in the runners and the gates can be avoided, and the material cost is reduced. Also, by using the resin block 114, the amount of the resin block 114 to be charged into each magnet insertion hole 104 can be correctly set without any excess or shortage, and the handling of the material resin can be improved so that the work efficiency of the resin charging step can be improved.

The die clamping process mentioned above is performed by the feedback control of the pressing forces that are produced by the servomotors 14 either in the single control target value mode or the individual control target value mode so that an appropriate pressurizing force can be achieved both quantitatively and accurately. Therefore, no excessive pressurizing force is applied to the laminated iron core 101 when the die assembly is clamped, and the laminated iron core 101 is prevented from being excessively deformed in the laminating direction. As a result, when the resin is cured while the die assembly is clamped, the planarity of the end surfaces of the laminated iron core 101 is not impaired following the releasing of the laminated iron core 101 from the die assembly, and the stacking height of the laminated iron core 101 is prevented from varying from one laminated iron core to another.

In addition, since the laminated iron core 101 is not deformed excessively in the laminating direction at the time of die clamping, no excessive stress is produced in the resin 112 which is cured in the magnet insertion holes 104 of the laminated iron core 101 when the die assembly is opened so that peeling and cracking of the resin 112 in the magnet insertion holes 104 can be avoided.

Thus, the leakage of the resin 112 to the outside of the magnet insertion holes 104 can be avoided, and the geometric precision and the dimensional precision of the laminated iron core 101 can be ensured at the same time. Therefore, the magnet embedded core 100 having a stable quality can be efficiently manufactured.

The proper pressurizing force when sealing the magnet pieces 110 in the magnet embedded core 100 with the resin varies depending on specifications such as the size of the laminated iron core 101 and the number of the iron core laminates, but since the pressurizing force can be freely selected by the quantitative control of the individual servomotors 14, a proper resin sealing can be achieved without regard to the size and the number of iron core laminates of the laminated iron core 101. Therefore, the investment for the resin sealing device 1 for performing resin sealing for a wide range of magnet embedded cores 100 can be reduced. In other words, with a minimum investment in the resin sealing device 1, the resin sealing device 1 can be easily adapted to the process of resin sealing for a wide range of magnet embedded cores 100.

Figure 10:
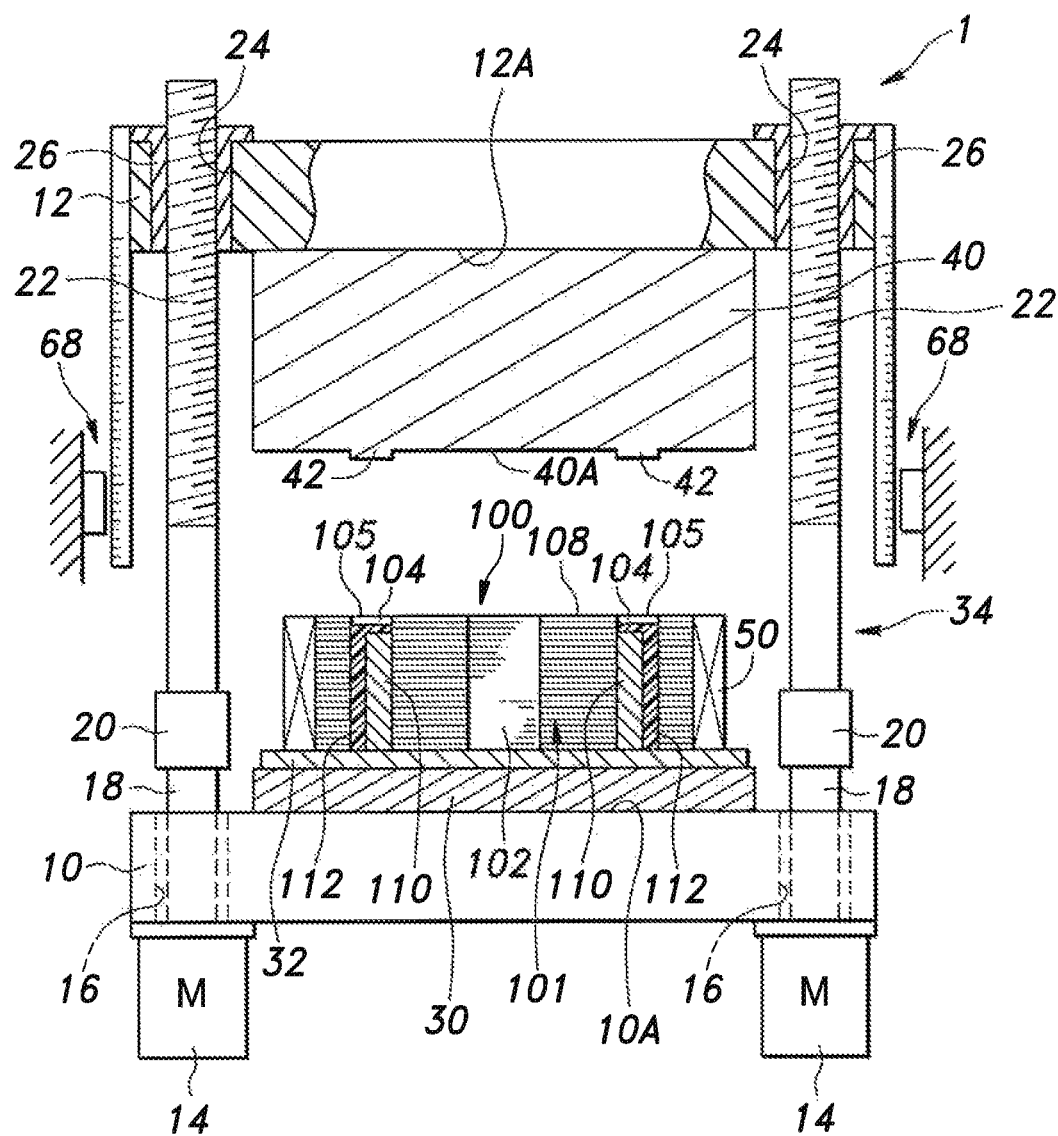
FIG. 10 is a front view of a resin sealing device for the magnet embedded core partly in section according to another embodiment of the present invention.
Figure 11:
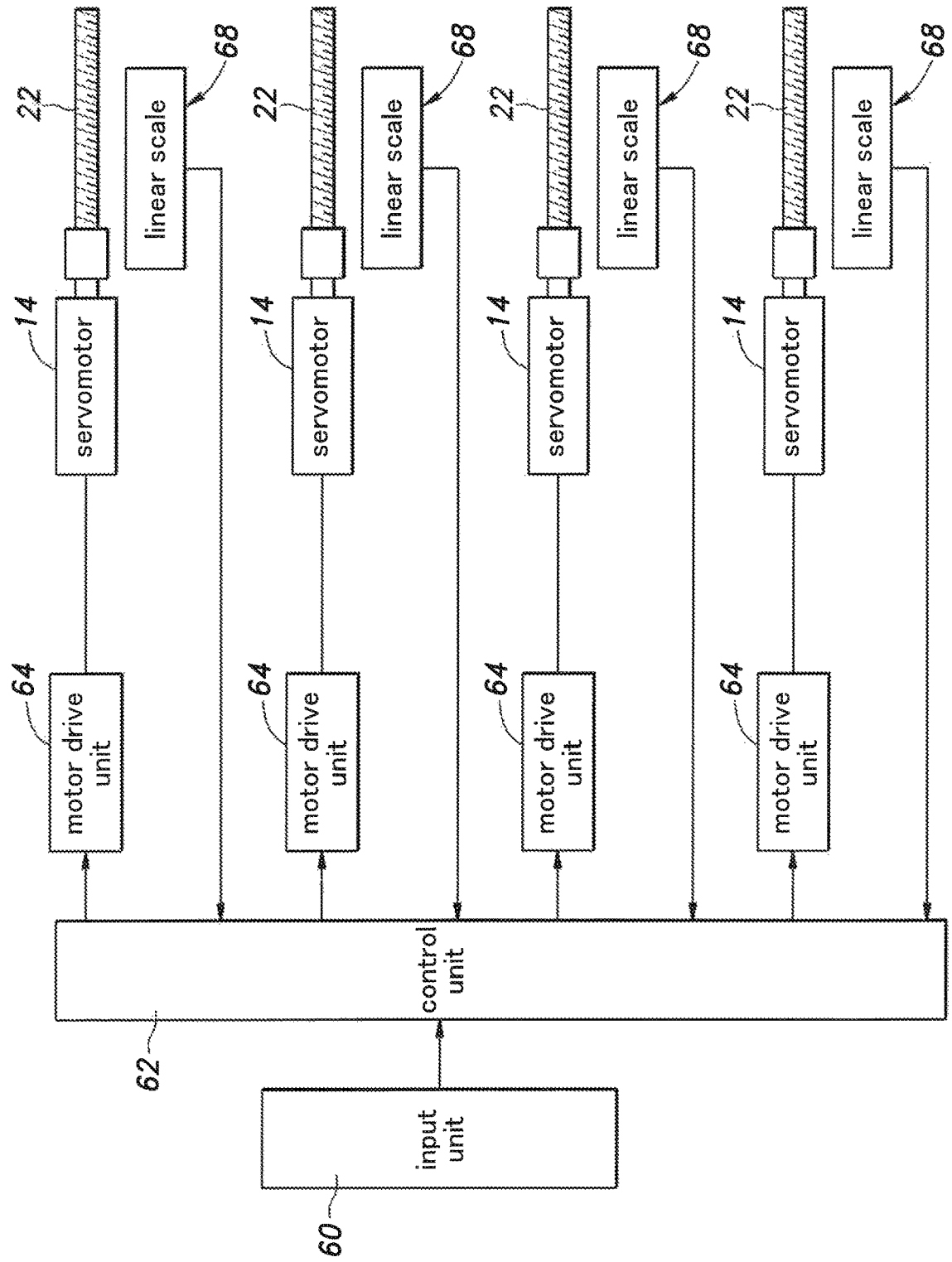
FIG. 11 is a Hock diagram of another embodiment of a control system for an electric die clamping device for the resin seating device.

Another embodiment of the present invention is described in the following with reference to FIGS. 10 and 11. In FIGS. 10 and 11, the parts corresponding to those shown in FIGS. 6 and 9 are denoted with like numerals, and such parts may be omitted from the following description.

In the present embodiment, a linear scale 68 is provided for each ball screw shaft 22 as a position sensor for individually detecting the position (height) of the upper moveable platen 12 (upper die 40) relative to the lower fixed platen 10 (lower die 30) at a location thereof (one of four corner parts of the upper moveable platen 12) corresponding to a corresponding one of the ball screw shafts 22. In other words, each linear scale 68 is configured to detect the position of the upper moveable platen 12 at a part thereof corresponding to the location of a corresponding one of the ball screw shafts 22 as a control variable of the electric die clamping device 34.

The control unit 62 converts the control target value forwarded from the input unit 60 into a control target value in terms of the position of the upper moveable platen 12. In particular, the control unit 62 sets a manipulated variable that reduces the deviation of the position (feedback value) detected by each linear scale 68 from the target control value to zero, and forwards a control action signal based on the manipulated variable to the corresponding motor drive unit 64.

In this embodiment, the pressurizing force is controlled by a feedback control based on position. In the case of the single control target value mode, the positions of the parts of the upper die 40 corresponding to the locations of the respective ball screw shafts 22 are variably selected as a same value so that the upper die 40 along with the upper moveable platen 12 is caused to descend in a strictly translational motion without changing the attitude of the upper die 40 to pressurize the laminated iron core 101 on the lower die 30.

In this case, the pressing state of the laminated iron core 101 is determined by the degree of parallelism between the lower surface 40A of the upper die 40 and the upper end surface 108 of the laminated iron core 101. As the parallelism between the lower surface 40A and the upper end surface 108 increases, the pressurization of the various parts of the laminated iron core 101 by the servomotors 14 is carried out according an appropriate, mutually uniform value.

In the individual control target mode, the position is variably and individually set to each location corresponding to a corresponding one of the ball screw shafts 22 so that the upper die 40 together with the upper moveable platen 12 descends possibly with the attitude thereof adjusted in an appropriate manner, and pressurizes the laminated iron core 101 on the lower die 30.

In this case, the parallelism between the lower surface 40A of the upper die 40 and the upper end surface 108 of the laminated iron core 101 is ensured by controlling the attitude of the upper die 40 of the upper moveable platen 12 or, in other words, by compensating the attitude of the upper die 40 so that the pressurization of the laminated iron core 101 can be performed by the servomotors 14 according to a uniform and appropriate target value. Further, in this case, the laminated iron core 101 may have an irregular shape such as a flower shape in plan view, and pressurization of the different parts of the laminated iron core 101 by the servomotors 14 can be performed with respective appropriate pressurizing forces.

In this embodiment also, since the pressurizing force can be selected freely based on position by the quantitative control of each servomotor 14, an excessive pressurizing force is prevented from acting on the laminated iron core 101 in the die clamped state, and the die clamping can be performed with an appropriate pressurizing force so that a magnet embedded core 100 with a high dimensional accuracy and a stable quality can be manufactured.

In the case of the position control of the upper moveable platen 12, it is also possible to correct the outer shape by controlling the stack parallelism of the laminated iron core 101. In the case of position control of the upper moveable platen 12, the setting of the control target value by the input unit 60 can also be set by the position of the upper moveable platen 12.

Figure 12:
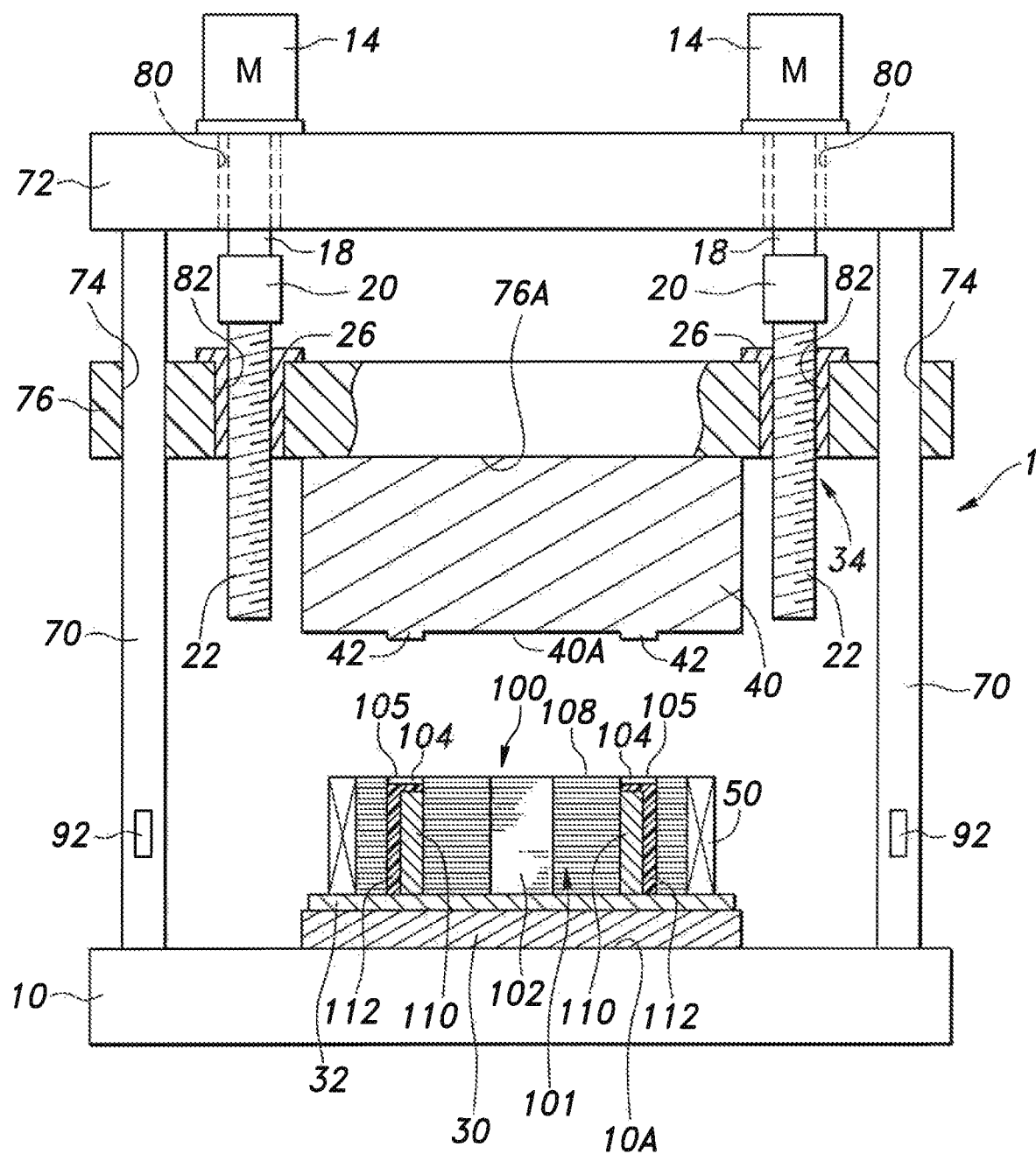
FIG. 12 is a front view of a resin sealing device for the magnet embedded core partly in section according to yet another embodiment of the present invention.

Yet another embodiment of a resin sealing device according to the present invention is described in the following with reference to FIG. 12. In FIG. 12, the parts corresponding to those shown in FIG. 6 are denoted with like numerals, and such parts may be omitted from the following description.

In this embodiment, tie bars 70 are fixed to four corner parts of the lower fixed platen 10 at the lower ends thereof. The upper ends of the tie bars 70 fixedly support an upper fixed platen 72 in the form of a rectangular plate that squarely opposes the lower fixed platen 10. An intermediate moveable platen 76 in the form of a rectangular plate is vertically slidably supported by the tie bars 70 via through holes 74 formed in the intermediate moveable platen 76 and slidably fitted on the respective tie bars 70. The upper die 40 is attached to the lower surface 76A of the intermediate moveable platen 76.

The servomotors 14 are attached to four corner parts of the upper fixed platen 72. The output shafts of the servomotors 14 are each passed through a corresponding through hole 80 formed in the upper fixed platen 72 in the axial direction (vertical direction), and connected to an upper end of a corresponding ball screw shaft 22 via a shaft coupling 20 in a torque transmitting relationship. Each ball nut 26 is fixed to the intermediate moveable platen 76 by being fitted into a through hole 82 formed in a corresponding part of the intermediate moveable platen 76, and threadably engages the ball screw shaft 22 provided in the corresponding location.

In this embodiment also, an electric die clamping device 34 is formed by the four servomotors 14, and in this embodiment, the intermediate moveable platen 76 is driven in the vertical direction by the servomotors 14.

Figure 9:
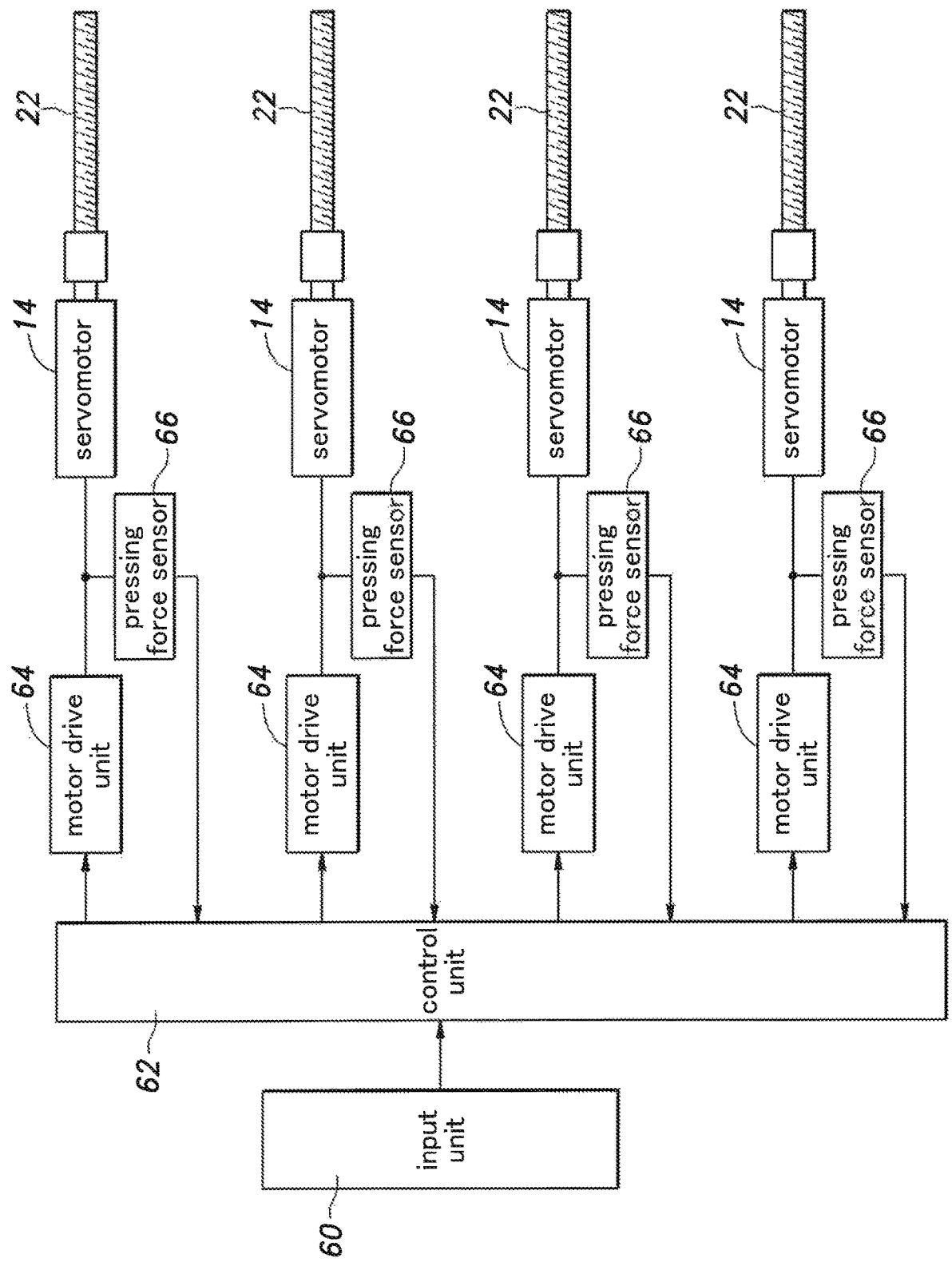
FIG. 9 is a block diagram of an embodiment of a control system for an electric die clamping device for the resin seating device.

In this embodiment also, since the pressurizing force can be set to a freely selected value by the quantitative control of each servomotor 14 in a control system similar to that shown in FIG. 9, an excessive pressurizing force is prevented from acting on the laminated iron core 101 in the die clamped state, and the laminated iron core 101 can be pressurized with an appropriate pressurizing force so that a magnet embedded core 100 with a high dimensional accuracy and stable quality can be manufactured.

In this embodiment, a strain gauge (load sensor) 92 is provided on each tie bar 70 as shown in FIG. 12 so that the pressing force acting between the lower die 30 and the upper die 40 in the die closed condition can be detected in various parts corresponding to the locations of the ball screw shafts 22 by using the strain gauges 92. In this embodiment also, by using a control system similar to that shown in FIG. 11, the feedback control of the pressurizing force based on position can be used.

Figure 13:
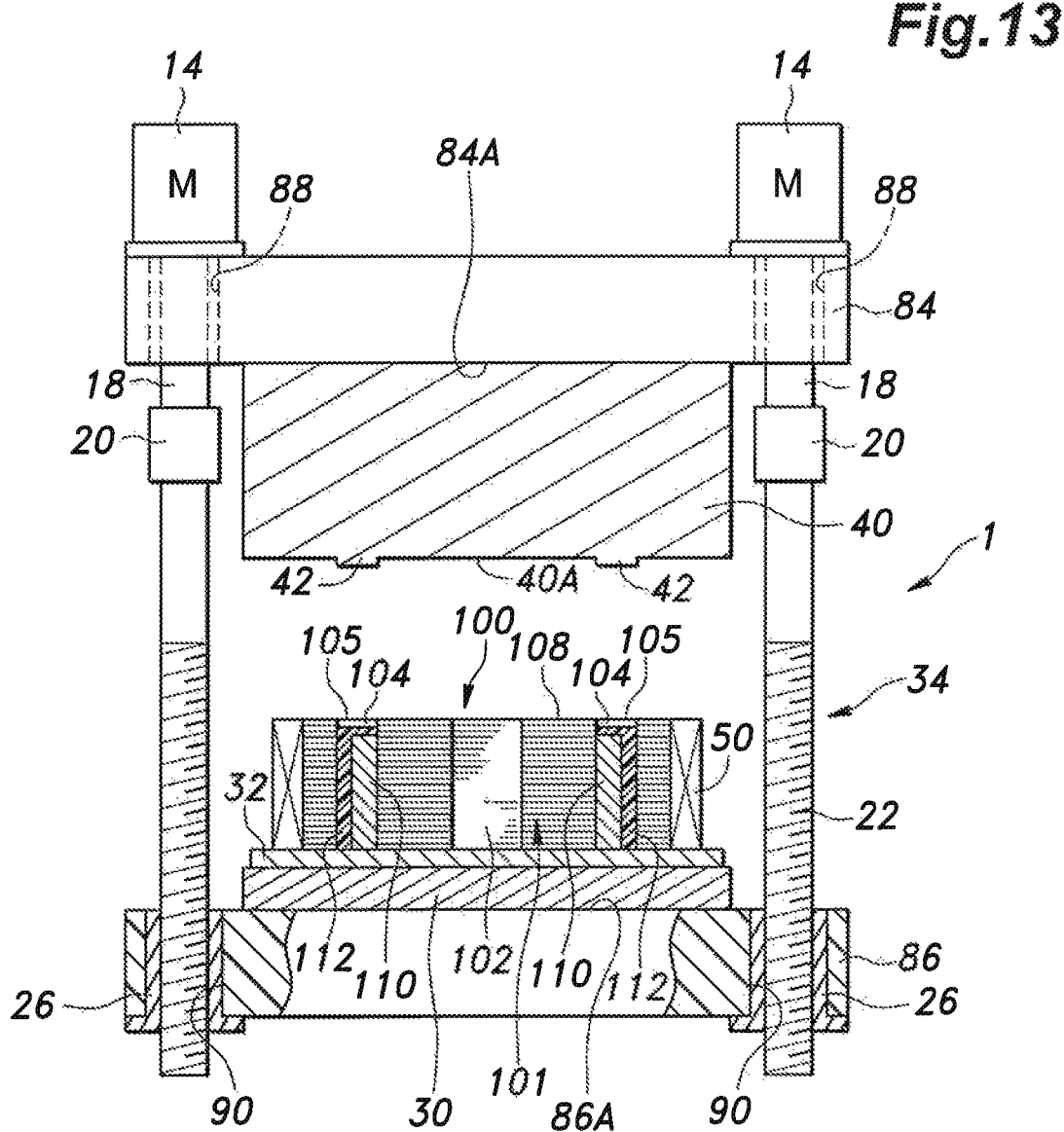
FIG. 13 is a front view of a resin sealing device for the magnet embedded core partly in section according to yet another embodiment of the present invention.

Yet another embodiment of a resin sealing device according to the present invention is described in the following with reference to FIG. 13. In FIG. 13, the parts corresponding to those shown in FIG. 6 are denoted with like numerals, and such parts may be omitted from the following description.

In this embodiment, the resin sealing device 1 includes an upper fixed platen 84 and a lower moveable platen 86 each in the form of a rectangular plate, vertically spaced from each other and squarely opposing each other.

The servomotors 14 are mounted on the upper fixed platen 84. The output shafts of the servomotors 14 are each passed through a corresponding through hole 88 formed in the upper fixed platen 84 in the axial direction (vertical direction), and connected to an upper end of a ball screw shaft 22 via a shaft coupling 20 in a torque transmitting relationship. Each ball nut 26 is fixed to the lower moveable platen 86 by being fitted into a through hole 90 formed in a corresponding part of the lower moveable platen 86, and threadably engages the ball screw shaft 22 provided in the corresponding location.

The lower die 30 serving as a moveable die is attached to the upper surface 86A of the lower moveable platen 86. The upper die 40 serving as a fixed die is attached to the lower surface 84A of the upper fixed platen 84.

In this embodiment also, since the pressurizing force can be set to a freely selected value by the quantitative control of each servomotor 14 in a control system similar to those shown in FIGS. 9 and 11, an excessive pressurizing force is prevented from acting on the laminated iron core 101 in the die clamped state, and the laminated iron core 101 can be pressurized with an appropriate pressurizing force so that a magnet embedded core 100 with a high dimensional accuracy and stable quality can be manufactured.

Figure 14:
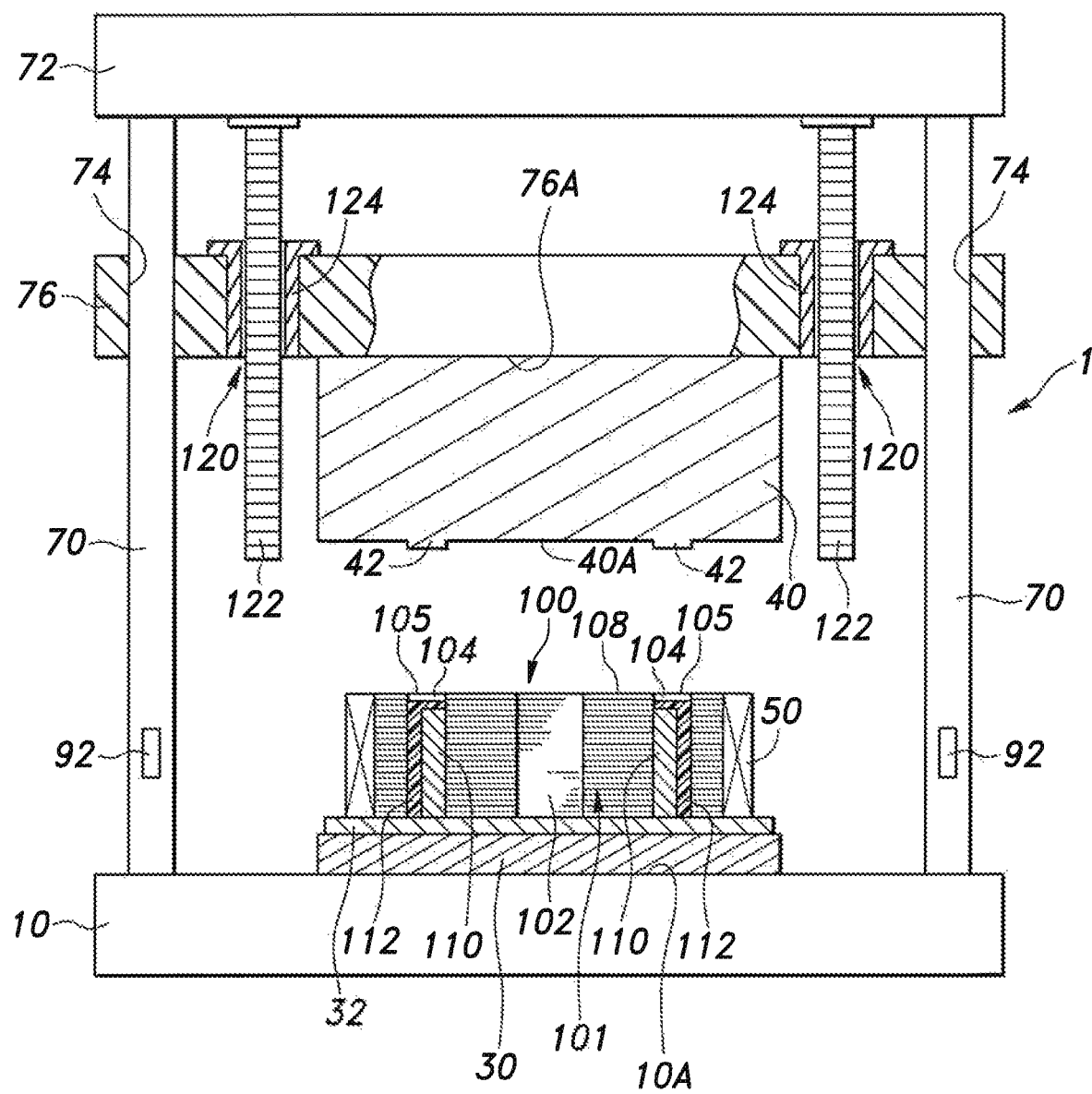
FIG. 14 is a front view of a resin sealing device for the magnet embedded core partly in section according to yet another embodiment of the present invention.

Yet another embodiment of a resin sealing device according to the present invention is described in the following with reference to FIG. 14. In FIG. 14, the parts corresponding to those shown in FIG. 12 are denoted with like numerals, and such parts may be omitted from the following description.

In this embodiment, fixed-side members 122 of four linear motors 120 each in a cylindrical rod configuration are fixed to four corner parts of the upper fixed platen 72, respectively, at upper ends thereof. The fixed-side members 122 thus depend from the upper fixed platen 72. Sleeve-shaped moveable-side members 124 of the linear motors 120 are fixed to four corner parts of the intermediate moveable platen 76, respectively, and each fixed-side member 122 is vertically passed through the corresponding moveable-side member 124.

Thus, the intermediate moveable platen 76 are vertically driven linearly by the linear motors 120. In this embodiment also, since the pressurizing force can be set to a freely selected value by the quantitative control of each linear motor 120 in a control system similar to those shown in FIGS. 9 and 11, an excessive pressurizing force is prevented from acting on the laminated iron 101 in the die clamped state, and the laminated iron core 101 can be pressurized with an appropriate pressurizing force so that a magnet embedded core 100 with a high dimensional accuracy and stable quality can be manufactured. Owing to the use of the linear motors 120, the mechanism for converting a rotary motion into a linear motion is not required so that the overall structure can be simplified.

Although the present invention has been described in terms of preferred embodiments thereof, as can be appreciated easily by a person skilled in the art, the present invention is not limited by these embodiments, but can be modified in appropriate ways without departing from the spirit of the present invention.

For instance, the sets each consisting of a servomotor 14, a ball screw shaft 22 and a ball nut 26 are not limited to four in number, but may also be at least three in number to be arranged around the laminated iron core 101 on the lower die 30. It is preferable that the sets each consisting of a servomotor 14, a ball screw shaft 22 and a ball nut 26 are arranged around a circle centered around the laminated iron core 101 on the lower die 30 at a regular interval for simplifying the pressurization control for the laminated iron core 101.

The feed mechanism for converting the linear motion of each servomotor 14 is not limited to the one using a ball screw shaft 22 and a ball nut 26, but may also consist of a screw shaft and nut using a screw ridge and a screw groove without interposing balls therebetween. Each ball screw shaft 22 may be driven by other forms of AC or DC electric motors instead of the servomotor 14. The rotational output of such an electric motor may be transmitted via a transmission device such as a gear transmission device and an endless transmission device, instead of being directly transmitted to the ball screw shaft 22. It is also possible to fixedly position each ball screw shaft 22, and mount the corresponding ball nut 26 on the moveable platen 12, 76, 86 in a rotatable manner so that the ball nut 26 may be rotatively driven by the electric motor.

The pressing force sensor may consist of a load cell or the like instead of the strain gauge 92.

The magnet insertion holes 104 are not necessarily required to be through holes each having two open ends, but may also be bottomed holes each opening out at only one of the end surfaces of the laminated iron core 101. The charging of the resin into the magnet insertion holes 104 may also be performed by using granular raw material resin or solid resin in sheet form or the like, instead of the resin block 114. When solid resin is used, since the load in the die opening direction due to the injection pressure of the resin does not act on the die assembly during the resin charging step, a relatively small clamping force may be required. Pressurization of the laminated iron core 101 at the time of the die clamping step is not necessarily required, and may only be required to the extent necessary for removing air bubbles from the resin 112 in the magnet insertion holes 104.

The heating of the resin block 114 with the heat of the magnet pieces 110 in the melting step is not essential for the present invention, and the preheating of the magnet pieces 110 may be omitted.

The charging of resin into the magnet insertion holes 104 may also be performed by injecting resin in liquid form into the magnet insertion holes 104 after the die assembly has been closed. In this case, a lateral type resin sealing device may be used.

The lower die 30 may configured to be moveable relative to the lower fixed platen 10 so as to serve as a conveying tray 32. It should be also noted that the conveying tray 32 is not essential for the present invention.

The constituent elements of the foregoing embodiments are not entirely essential for the present invention, but may be suitably omitted or substituted without departing from the spirit of the present invention.

| GLOSSARY OF TERMS | | | |
|---|---|---|---|
| 1 | resin sealing device | 10 | lower fixed platen |
| 10A | upper surface | 12 | upper fixed platen |
| 12A | lower surface | 14 | servomotor |
| 16 | through hole | 18 | output shaft |
| 20 | shaft coupling | 22 | ball screw shaft |
| 24 | through hole | 26 | ball nut |
| 30 | lower die | 32 | conveying tray |
| 34 | electric die clamping device | 40 | upper die |
| 40A | lower surface | 42 | projection |
| 50 | heating device | 60 | input unit |
| 62 | control unit | 64 | motor drive unit |
| 66 | pressing force sensor | 68 | linear scale |
| 70 | tie bar | 72 | upper fixed platen |
| 74 | through hole | 76 | intermediate moveable platen |
| 76A | lower surface | 80 | through hole |
| 82 | through hole | 84 | upper fixed platen |
| 84A | lower surface | 86 | lower fixed platen |
| 86A | upper surface | 88 | through hole |
| 90 | through hole | 92 | strain gauge |
| 100 | magnet embedded core | 101 | laminated iron core |
| 102 | center hole | 104 | magnet insertion hole |
| 104A | inner surface | 104B | inner surface |
| 105 | upper opening | 106 | iron core laminate |
| 108 | upper end surface | 110 | magnet piece |
| 110A | outer surface | 112 | resin |
| 114 | resin block | 114A | outer surface |
| 114B | outer surface | 120 | linear motor |
| 122 | fixed-side member | 124 | moveable-side member |

The invention claimed is:

1. A resin sealing method for manufacturing a magnet embedded core including a laminated iron core having magnet insertion holes formed therein, each of the magnet insertion holes being provided with an opening at least at one of a plurality of end surfaces of the laminated iron core, and a magnet piece inserted in each of the magnet insertion holes and sealed by a resin charged into each of the magnet insertion holes, wherein the resin sealing method uses a resin sealing device including a fixed platen, a moveable platen placed opposite to the fixed platen so as to be moveable in a direction toward and away from the fixed platen, an electric die clamping device including at least three electric motors and configured to drive the moveable platen in the direction toward and away from the fixed platen, a fixed die attached to the fixed platen, a moveable die attached to the moveable platen, a plurality of pressing force sensors, wherein a corresponding pressing force sensor of the plurality of pressing force sensors corresponds to an electric motor of the at least three electric motors, and a control unit, the method comprising:

an iron core positioning step of positioning the laminated iron core on one of the fixed die or the moveable die;

a resin charging step of charging the resin in a solid state into the magnet insertion holes;

a magnet piece insertion step of inserting a magnet piece into each of the magnetic insertion holes after the resin charging step; and a pressurizing step of causing, by use of the die clamping device, the other of the fixed die or the moveable die to abut onto the end surface of the laminated iron core to close the opening of each of the magnet insertion holes and pressurize the laminated iron core in a laminating direction with the other of the fixed die or the moveable die, wherein the method further comprises a melting step of melting the resin in the solid state in the magnet insertion holes, and a curing step of curing the resin in a molten state in the pressurizing step, and wherein in the pressurizing step, the resin is cured, a pressing force acting between the fixed die and the moveable die due to driving of each of the at least three electric motors is detected by a the corresponding pressing force sensor, and the driving of the at least three electric motors is controlled by the control unit to reduce a deviation of the pressing force detected by each of the corresponding pressing force sensor of the plurality of pressing force sensors from a control target value.

2. The resin sealing method for manufacturing a magnet embedded core as defined in claim 1, wherein the resin consists of a thermosetting resin, and the resin pressurized in the pressurizing step is cured by heating the laminated iron core.

3. The resin sealing method for manufacturing a magnet embedded core as defined in claim 1, wherein the melting step includes at least partly melting the resin in the solid state by preheating and inserting the magnet piece into each of the magnet insertion holes.

4. The resin sealing method for manufacturing a magnet embedded core as defined in claim 2, wherein the melting step includes at least partly melting the resin in the solid state by preheating and inserting the magnet piece into each of the magnet insertion holes.

* * * * *

UNITED STATES PATENT AND TRADEMARK OFFICE
CERTIFICATE OF CORRECTION

| | |
|---|---|
| PATENT NO. | : 11,201,526 B2 |
| APPLICATION NO. | : 16/087675 |
| DATED | : December 14, 2021 |
| INVENTOR(S) | : Osamu Fukuyama |

It is certified that error appears in the above-identified patent and that said Letters Patent is hereby corrected as shown below:

In the Claims

Claim 1, Column 19, Line 7 of the last wherein clause, please correct "each of the corresponding pressing force sensor" to "each corresponding pressing force sensor,"

Claim 1, Column 19, Line 8 of the last wherein clause, please correct "a the" to "the"

Signed and Sealed this
Eighth Day of November, 2022

*Katherine Kelly Vidal*
Katherine Kelly Vidal
*Director of the United States Patent and Trademark Office*